United States Patent
Farhat et al.

(10) Patent No.: US 10,746,088 B2
(45) Date of Patent: *Aug. 18, 2020

(54) VARIABLE THERMAL CAPACITY CHARGE AIR COOLER

(71) Applicant: Ford Global Technologies, LLC, Dearborn, MI (US)

(72) Inventors: Hassan Farhat, Dearborn, MI (US); Ravi Gopal, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,730

(22) Filed: Sep. 13, 2019

(65) Prior Publication Data
US 2020/0003110 A1 Jan. 2, 2020

Related U.S. Application Data

(63) Continuation-in-part of application No. 15/908,259, filed on Feb. 28, 2018, now Pat. No. 10,465,596.

(51) Int. Cl.
*F02B 29/04* (2006.01)

(52) U.S. Cl.
CPC ...... *F02B 29/0418* (2013.01); *F02B 29/0475* (2013.01); *F02B 29/0493* (2013.01)

(58) Field of Classification Search
CPC .... F02B 29/0418; F02B 29/042; F02B 61/00; Y10S 903/902
See application file for complete search history.

(56) References Cited

U.S. PATENT DOCUMENTS

| | | | |
|---|---|---|---|
| 5,152,144 A | 10/1992 | Andrie | |
| 6,085,834 A | 7/2000 | Thomas et al. | |
| 7,007,680 B2 | 3/2006 | Tussing et al. | |
| 7,163,005 B2 | 1/2007 | Tussing et al. | |
| 7,198,037 B2 | 4/2007 | Sayers et al. | |
| 7,828,044 B2 | 11/2010 | Hagberg et al. | |
| 7,886,724 B2 | 2/2011 | Tai et al. | |
| 8,726,889 B2 | 5/2014 | Cockerill et al. | |
| 10,465,596 B2 * | 11/2019 | Farhat | F02B 29/0425 |
| 2014/0048049 A1 | 2/2014 | Glugla et al. | |

* cited by examiner

*Primary Examiner* — Kevin A Lathers
(74) *Attorney, Agent, or Firm* — Geoffrey Brumbaugh; McCoy Russell LLP

(57) ABSTRACT

Methods and systems are provided for variable thermal capacity charge air cooler (VTC-CAC). In one example, the VTC-CAC includes a plurality of cooling channels and an integrated bypass that diverts air around the cooling channels. Division of boosted intake air between the cooling channels and the bypass is regulated by a positioning of dual-gate mechanism that is adjusted in response to manifold charge temperature.

20 Claims, 13 Drawing Sheets

VARIABLE THERMAL CAPACITY CHARGE AIR COOLER

CROSS REFERENCE TO RELATED APPLICATIONS

The present application is a continuation-in-part of U.S. Non-Provisional patent application Ser. No. 15/908,259, entitled "VARIABLE THERMAL CAPACITY CHARGE AIR COOLER", and filed on Feb. 28, 2018. The entire contents of the above-listed application are hereby incorporated by reference for all purposes.

FIELD

The present description relates generally to methods and systems for a charge air cooler configured to adjust air flow through the cooler.

BACKGROUND/SUMMARY

A charge air cooler is often included in a boosted engine system to improve a combustion efficiency of the engine. Intake air entering the engine may be compressed, or boosted, by a turbocharger compressor prior to combustion, resulting in an increase in temperature of the air. The warmed air may be channeled through the charge air cooler (CAC) to cool the air before being delivered to an intake manifold for subsequent mixing with fuel followed by ignition of the mixture at the engine cylinders. Cooling the boosted air increases its density so that a greater number of air molecules are introduced to the cylinders per unit volume of air, resulting in a proportional increase in a power output of the engine that is derived by combustion of the air-fuel mixture. Furthermore, cooling the boosted air decreases the amount of $NO_x$ emitted as a combustion product and reduces a likelihood of engine knock which may otherwise lead to degradation of engine performance.

The CAC, also known as an intercooler or aftercooler, is a heat exchange device formed from a thermally conductive material such as aluminum or another type of metal. A surface of the CAC is often arranged in a front compartment of a vehicle, perpendicular to air flow generated during vehicle navigation, to facilitate air-to-air cooling of the boosted air passing through the CAC. The CAC is often configured with alternating rows of tubes and fins that are held together by two headers plates with tanks welded to the headers. The tubes may be fluidically coupled at either end to one of the tanks so that air delivered to a first, inlet tank is channeled through the tubes, combined at a second, outlet tank and released from the CAC to be delivered to the intake through an intake passage. The fins may increase a surface area of the CAC that comes into contact with the cooling cross-air flow. Heat is thus transferred from the warm boosted air, to the cooler surfaces of the CAC tubes which are, in turn, cooled by ram air and the engine cooling fan.

The cooling of the boosted air, however, may lead to condensation issues. For example, in humid climates, a temperature of the relatively moist air cooled by the CAC may fall below a dew point of the air. This may result in water droplets condensing within channels of the CAC, the intake passage, or intake manifold. During periods of high boost demand driving increased air flow through the CAC, the water droplets may be purged into the engine cylinders during an intake cycle of the cylinders, leading to misfiring at the cylinders or hydrolock.

In addition, cooling the boosted air below a threshold, such as the dew point, may lower a manifold charge temperature of the engine. While lower charge air (e.g. boosted air ignited at the engine cylinders) temperature may enhance engine performance and reduce $NO_x$ emissions, a concomitant decrease in combustion temperature may lead to undesirably high levels of carbon monoxide and hydrocarbon discharged from the engine exhaust.

Other attempts to address overcooling of air flowing through the CAC include adapting the engine with a bypass system to allow warmed air to reach the intake manifold. One example approach is shown by Tussing et al. in U.S. Pat. No. 7,007,680. Therein, a bypass line diverts boosted air around a charge air cooler. Air flow through the bypass is controlled via a bypass valve that is actuated by a bypass controller. The bypass controller is configured to operate the bypass valve based on an intake manifold temperature and the bypass valve includes rotatable valve plates that are actuated by a device such as a solenoid or motor. Warmed air is diverted around the CAC and mixed with air exiting the CAC to maintain the temperature of the intake manifold above a dew point.

However, the inventors herein have recognized potential issues with such systems. As one example, when at least a portion of the intake air is diverted to the bypass around the CAC, the amount of air passing through the CAC is proportionally reduced. The air is sent to all channels of the CAC which are exposed to ram air (and fanned air) at ambient temperature. During low mass flow rates, a temperature difference between the bypassed air and cooled air may be increased due to longer contact between air molecules and cooling surfaces of the CAC channels, thus decreasing the modulating effect of the bypassed air on the manifold charge temperature (MCT). Furthermore, regulation of air flow between the bypass and CAC channels may introduce undesirable complexity of control by burdening the system with additional sensors and valves.

In one example, the issues described above may be addressed by a cooling system of an engine comprising an intake passage configured to deliver boosted air to an intake manifold of the engine, a charge air cooler coupled to the intake passage, wherein the charge air cooler has an integrated bypass, a plurality of cooling channels, and a dual-gate mechanism arranged at an outlet end of the charge air cooler, the dual-gate mechanism including a first gate controlling flow of boosted air from the integrated bypass to the outlet and a second gate dividing the plurality of cooling channels into open channels and blocked channels, the blocked channels fluidically blocked from flowing intake air to the outlet. In this way, the MCT may be regulated by a single device actuated in response to output from sensors already existing in the engine system.

As one example, the variable thermal capacity charge air cooler (VTC-CAC) may be adapted with an integrated bypass and a dual-gate mechanism that portions air flow between the integrated bypass and the cooling channels of the VTC-CAC. The dual-gate mechanism is arranged in a header tank of the VTC-CAC and comprises a first gate that adjusts a number of cooling channels open to air flow and a second gate that moderates an opening to the bypass. Movement of both gates is caused by a rotating screw that extends across the header tank and includes different thread pitches to achieve a difference in a speed of movement between the first and second gates (e.g., the first gate may move along a first section of the rotating screw that has a first thread pitch and the second gate may move along a second section of the rotating screw that has a second thread pitch, different than the first thread pitch). By adapting an engine system with the VTC-CAC, the MCT may be controlled using a single inexpensive device, and a likelihood of condensation forming and/or accumulating within the intake passage or intake manifold is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-7C and 9-12 are shown approximately to scale.

DETAILED DESCRIPTION

Figure 4:
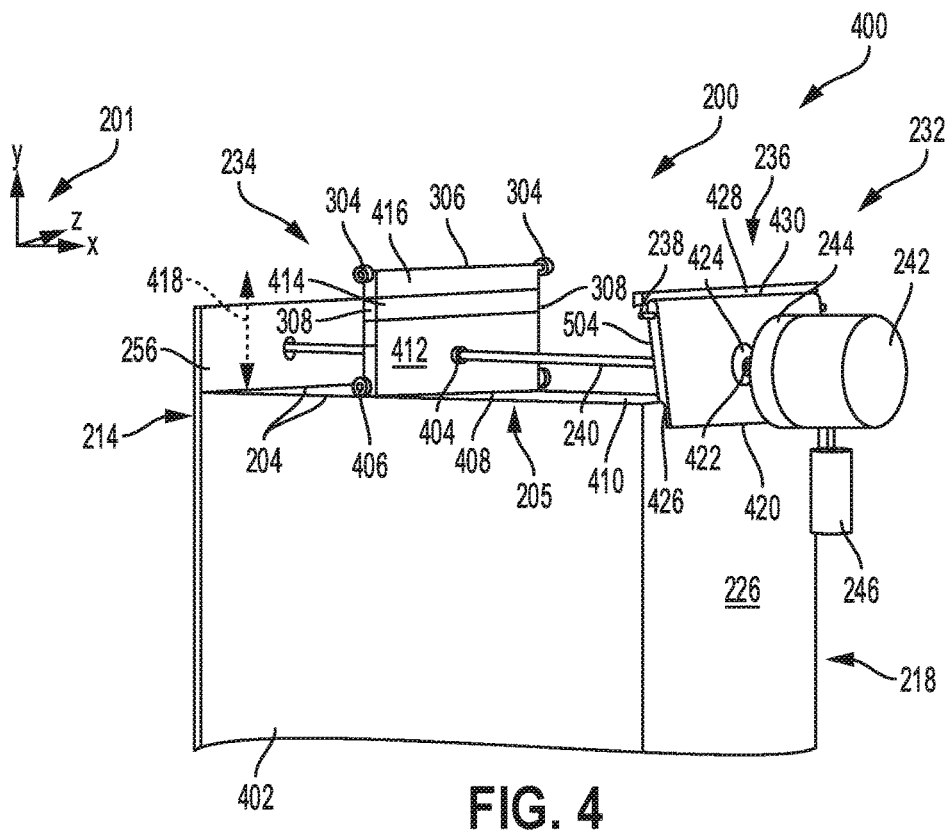
FIG. 4 shows a perspective view of the dual-gate mechanism of the VTC-CAC.
Figure 5:
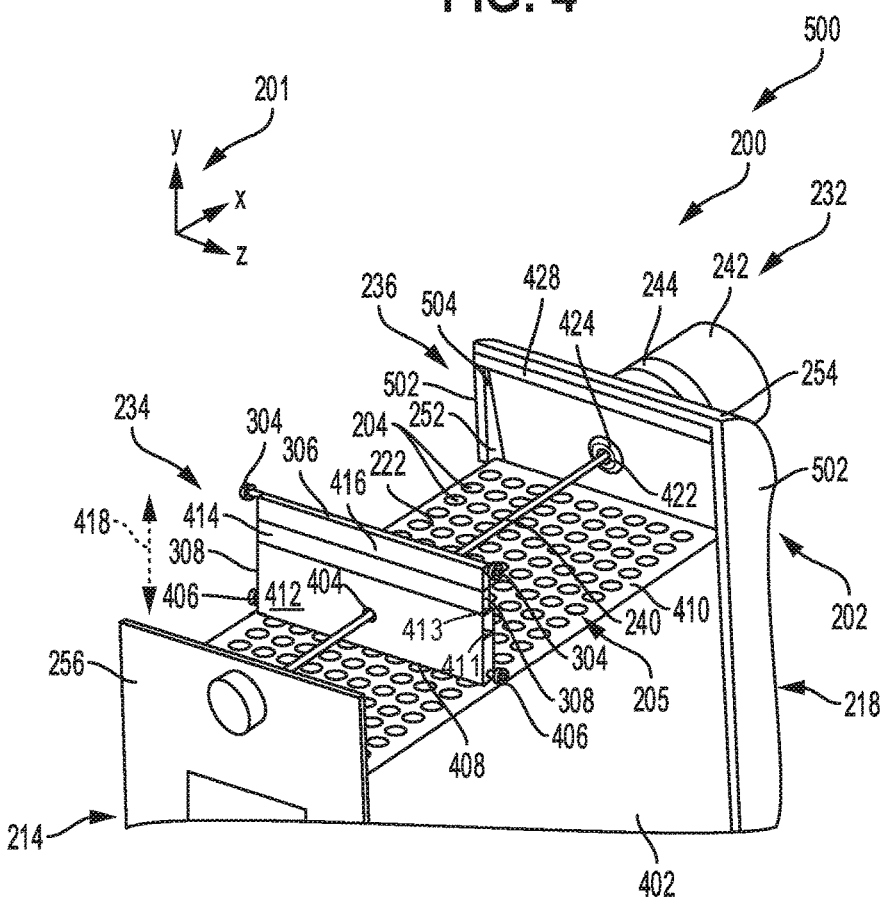
FIG. 5 shows a perspective view of the dual-gate mechanism of the VTC-CAC from a different angle.
Figure 6:
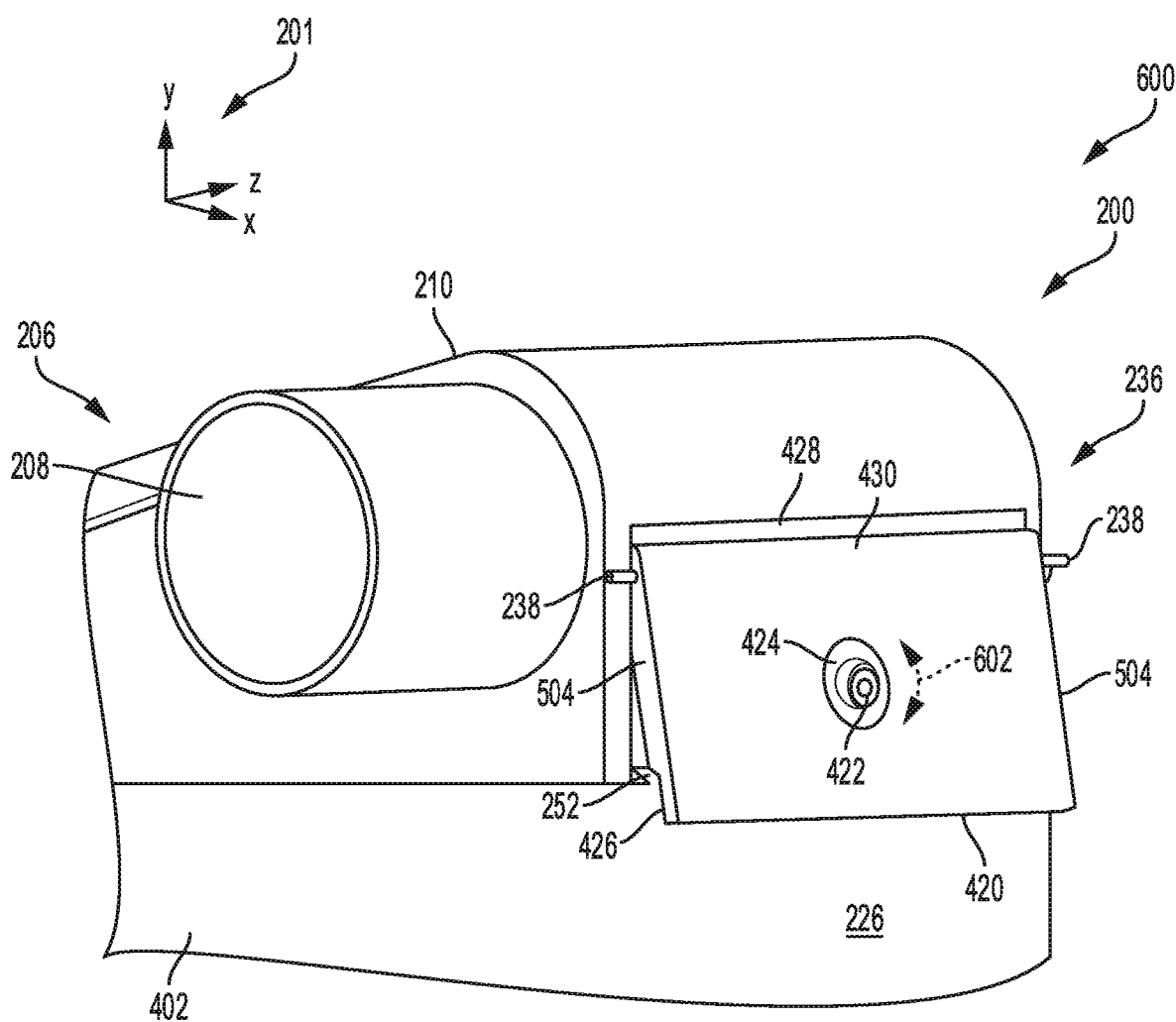
FIG. 6 shows a perspective view of a hinged gate of the dual-gate mechanism of the VTC-CAC.
Figure 7A:
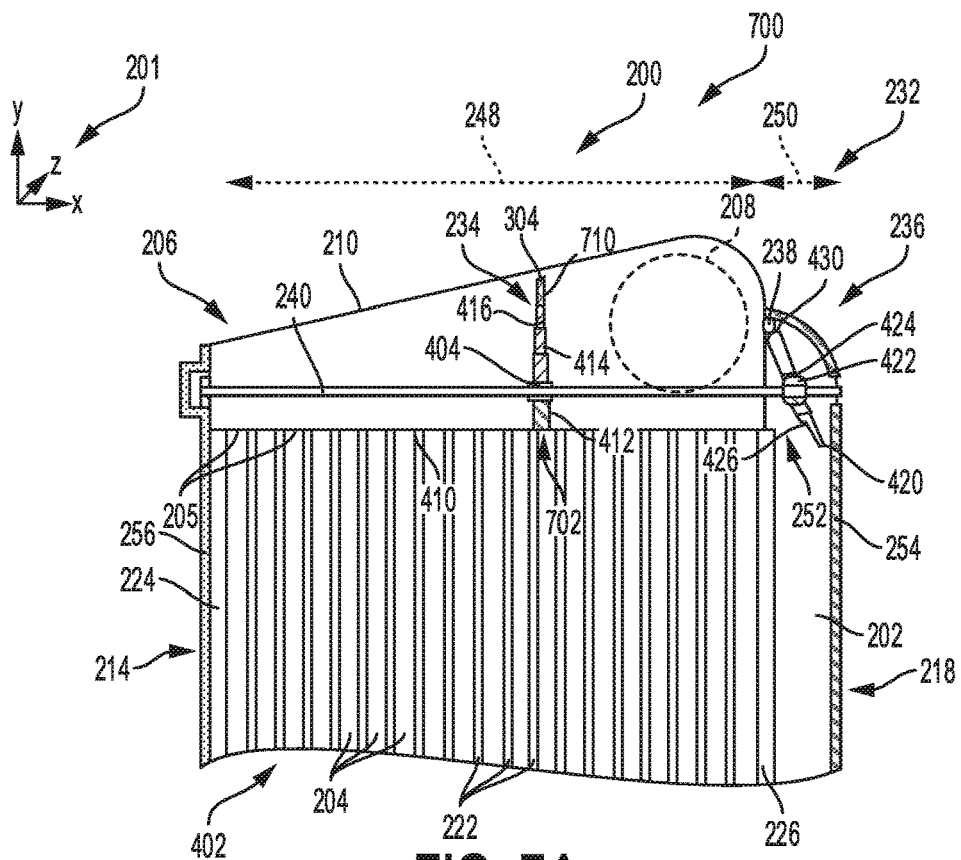
FIG. 7A shows the VTC-CAC with the dual-gate mechanism in a first position.
Figure 7B:
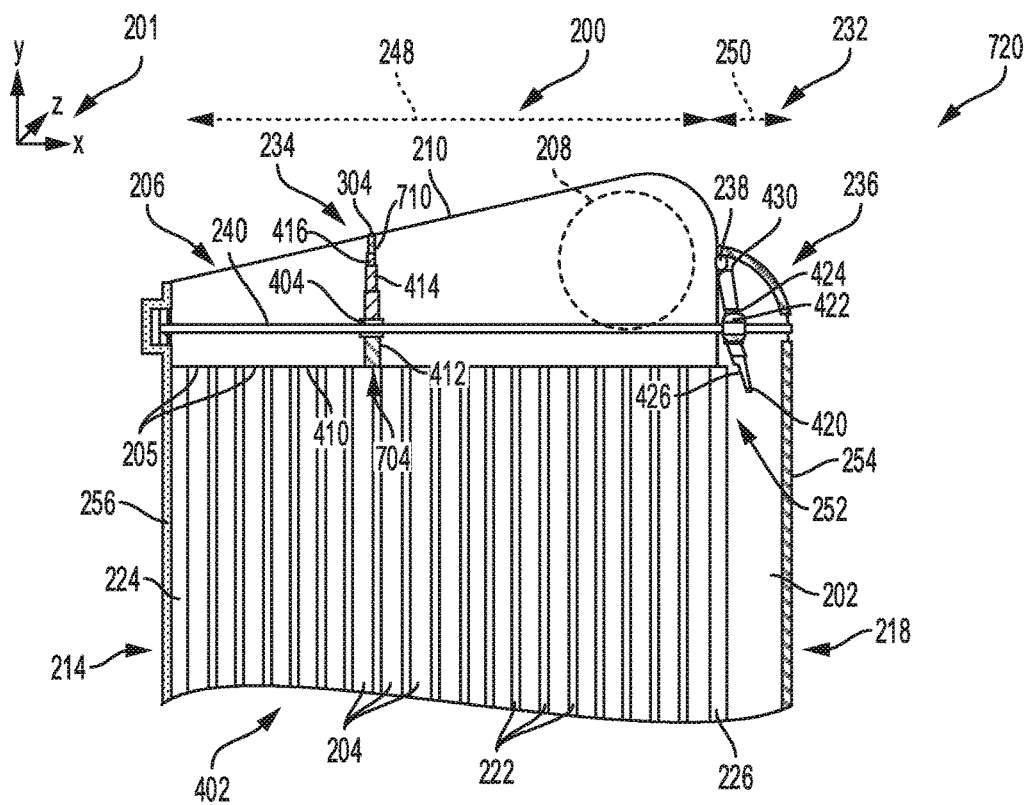
FIG. 7B shows the VTC-CAC with the dual-gate mechanism in a second position.
Figure 7C:
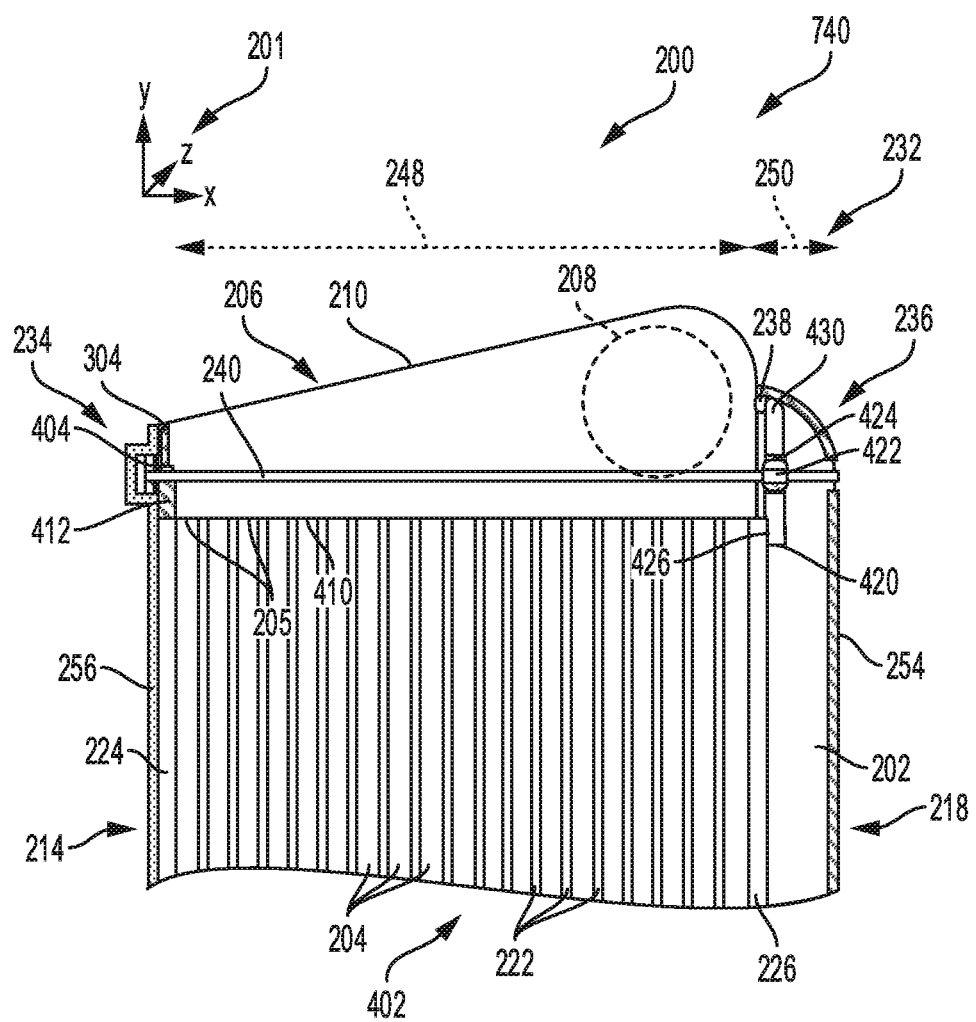
FIG. 7C shows the VTC-CAC with the dual-gate mechanism in a third position.
Figure 8:
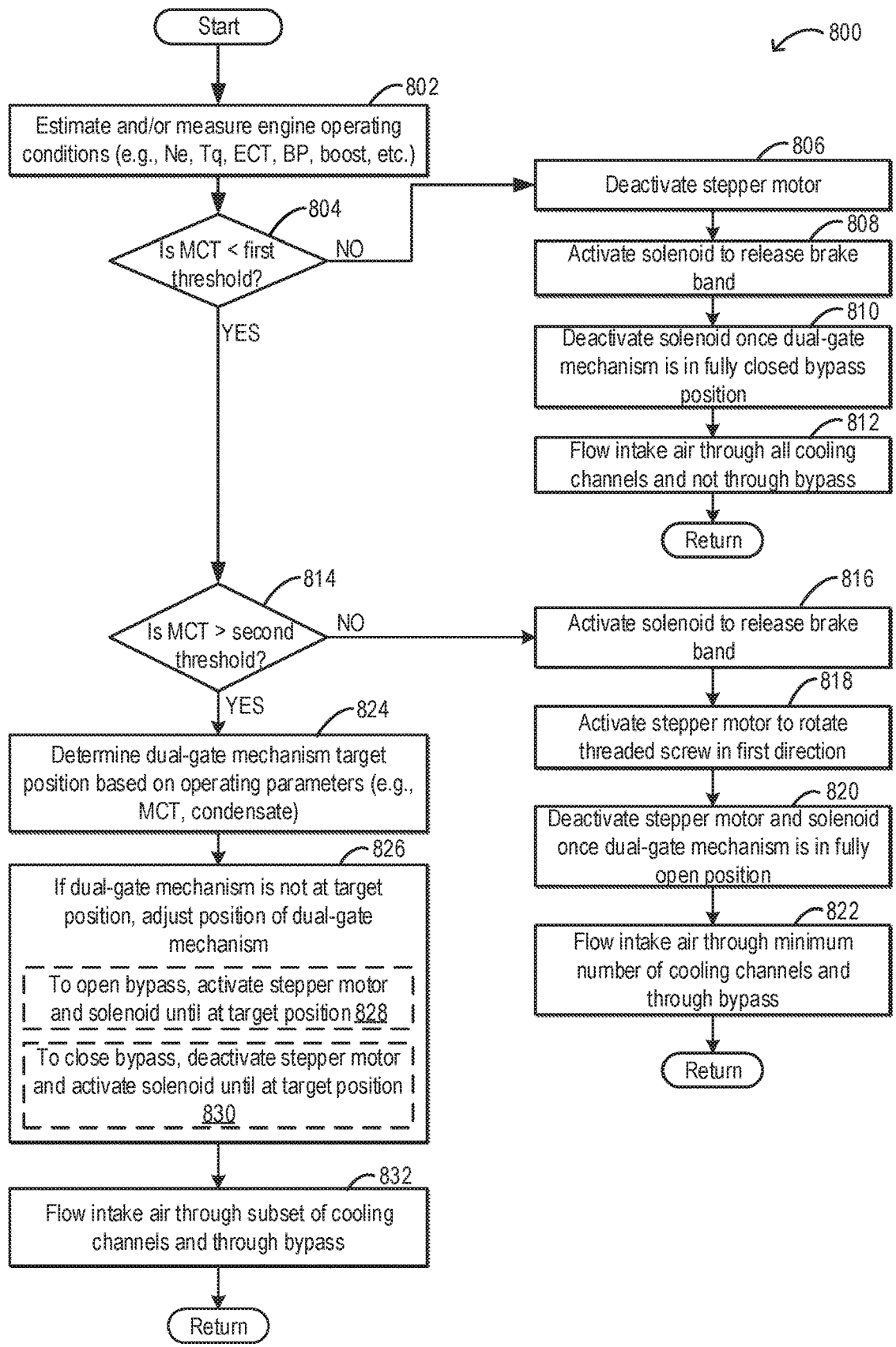
FIG. 8 shows an example routine for adjusting a VTC-CAC in response to MCT.
Figure 9:
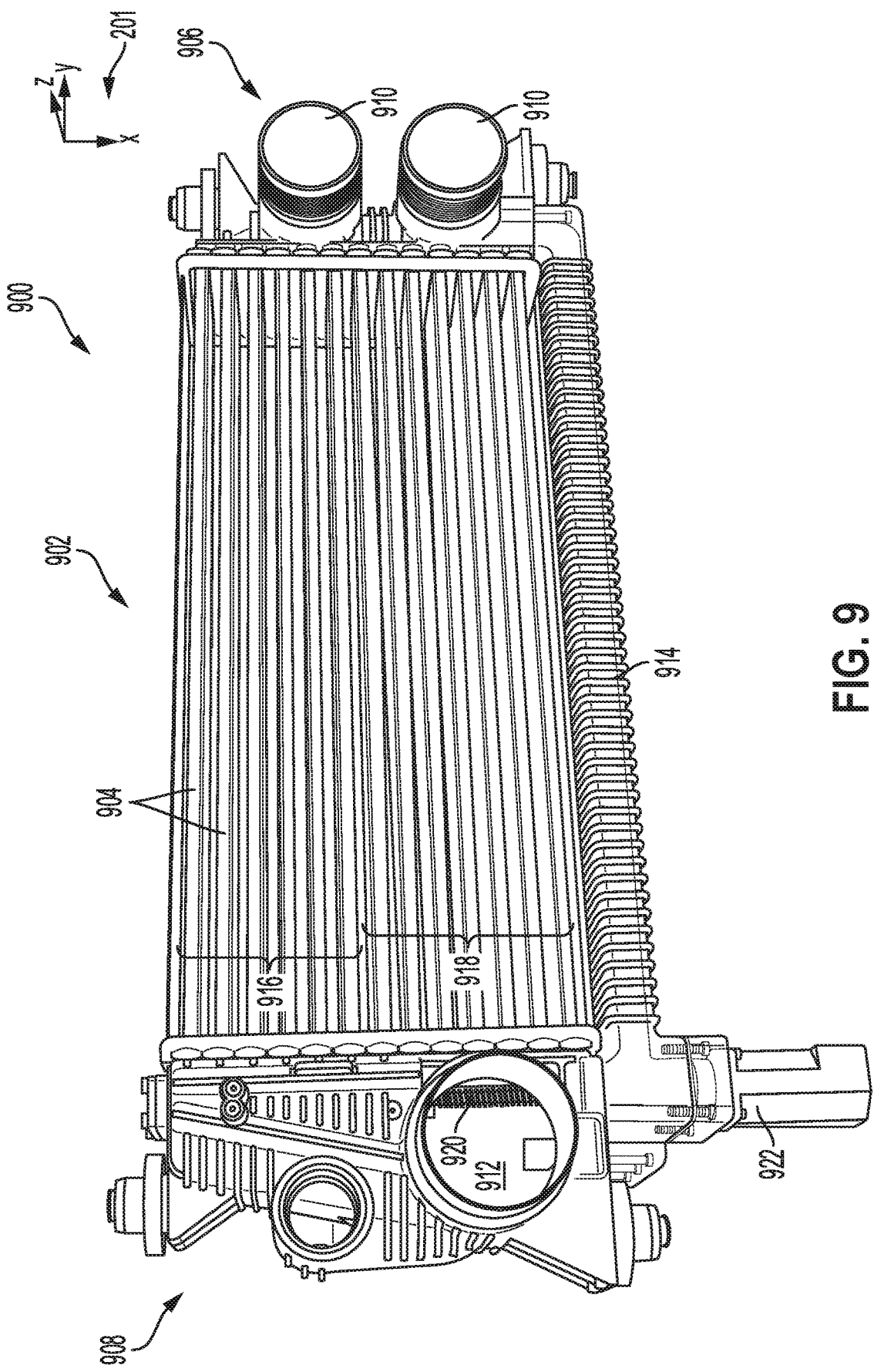
FIG. 9 shows a second example of a VTC-CAC.
Figure 10:
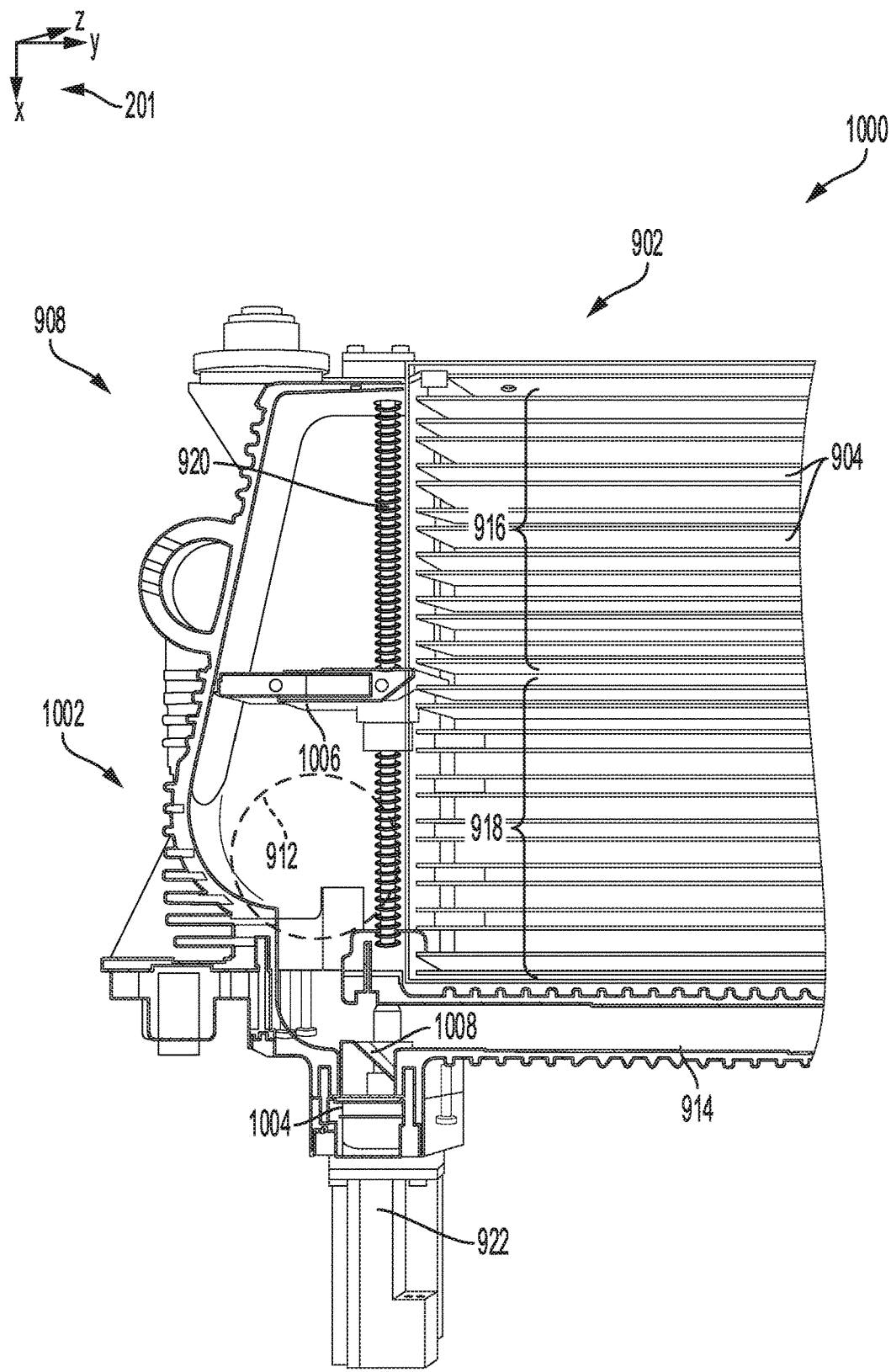
FIG. 10 shows cut-away view of the VTC-CAC of FIG. 9.
Figure 11:
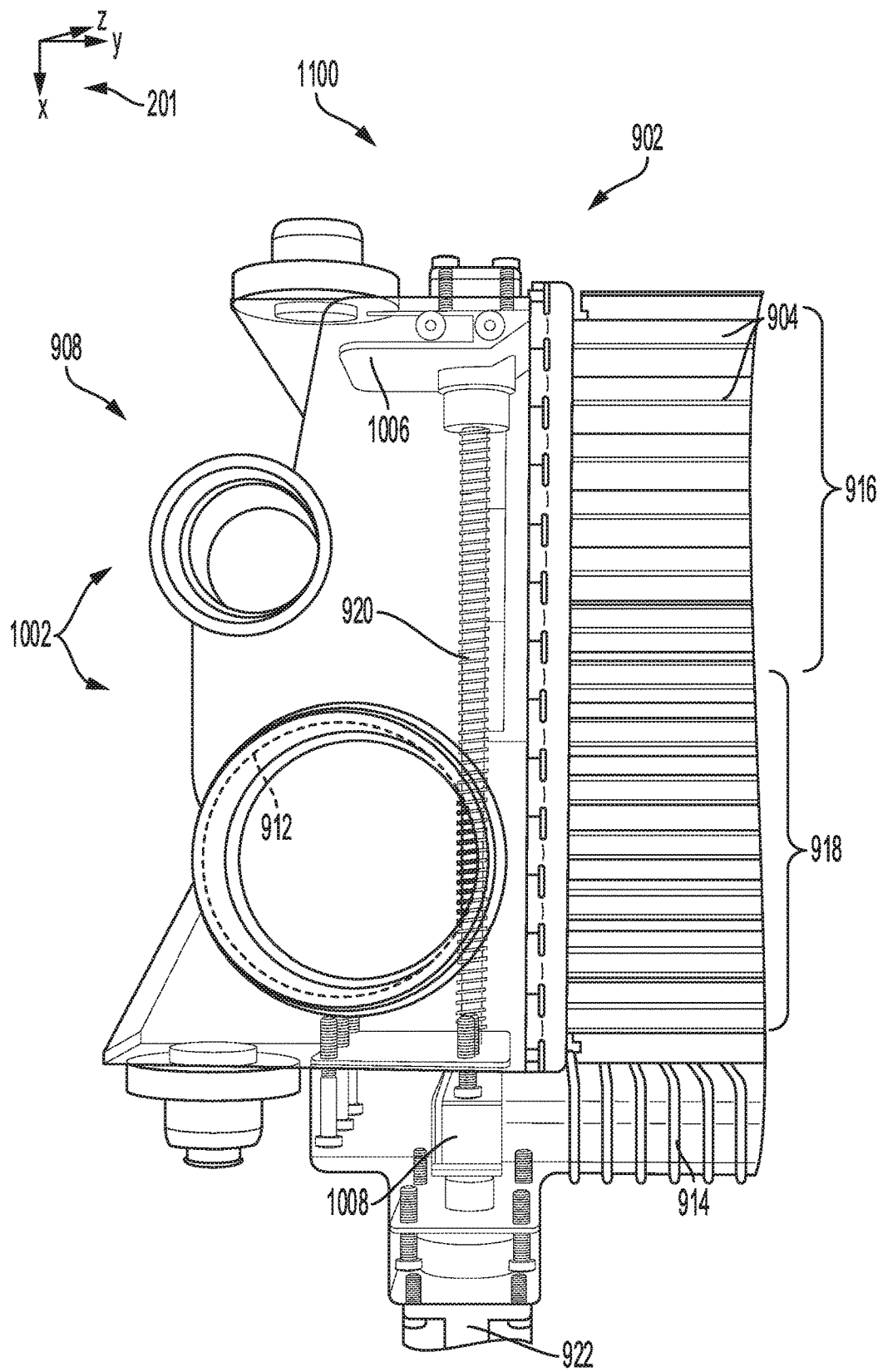
FIG. 11 shows an alternate gate mechanism for a VTC-CAC in a first position.
Figure 12:
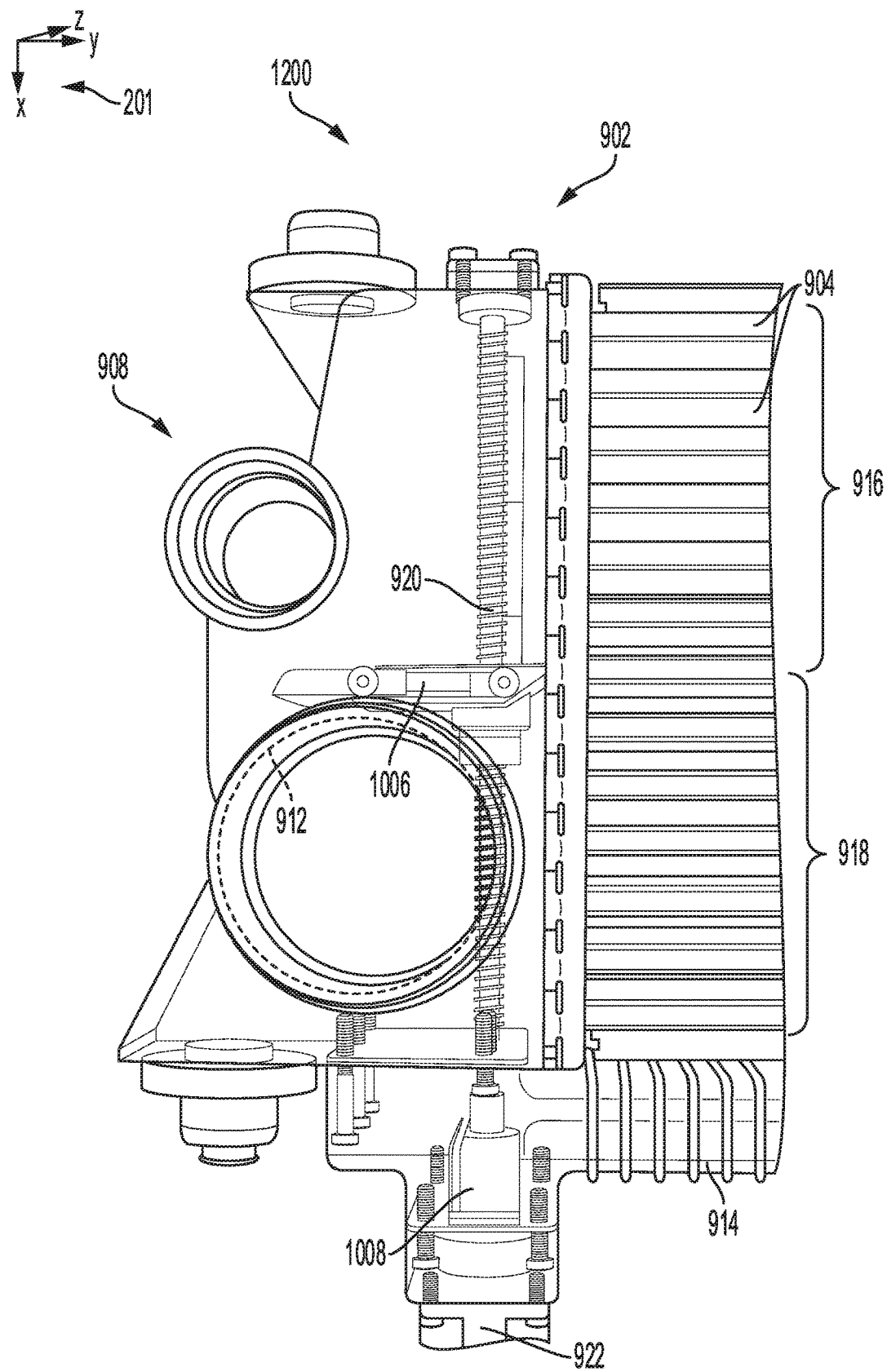
FIG. 12 shows the alternate gate mechanism for the VTC-CAC in a second position.
Figure 13:
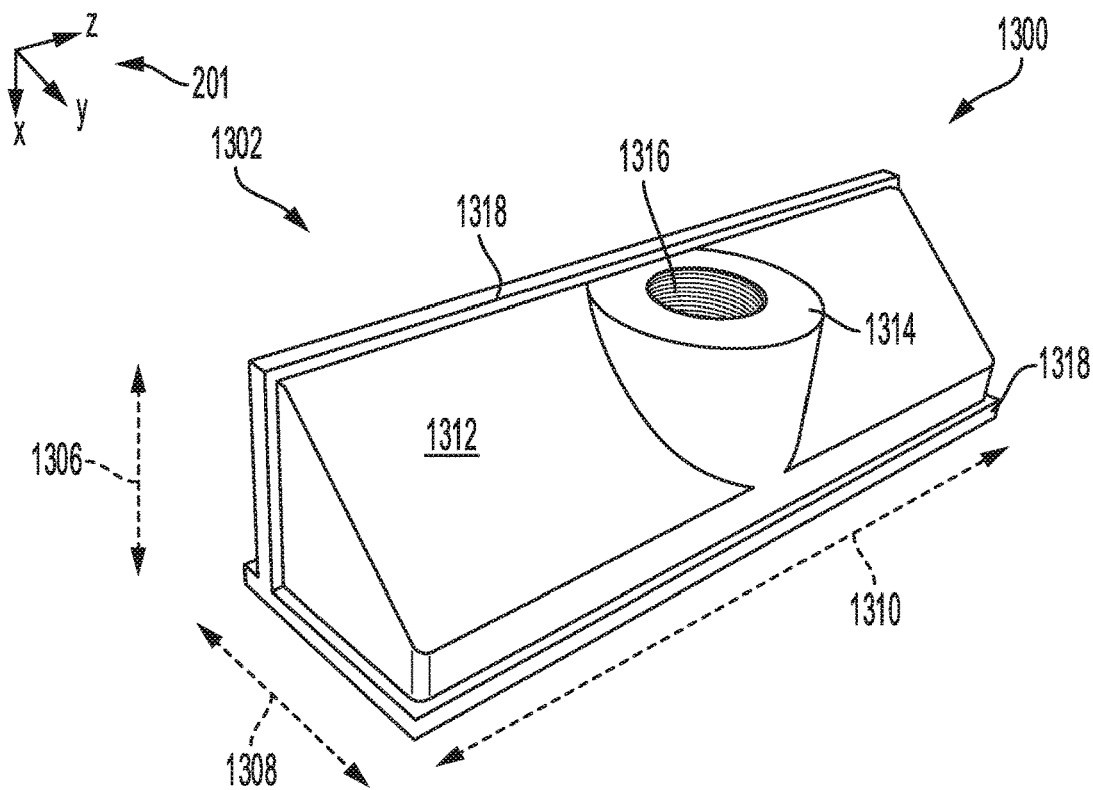
FIG. 13 shows an example of threaded valve of a dual-gate mechanism.
Figure 14:
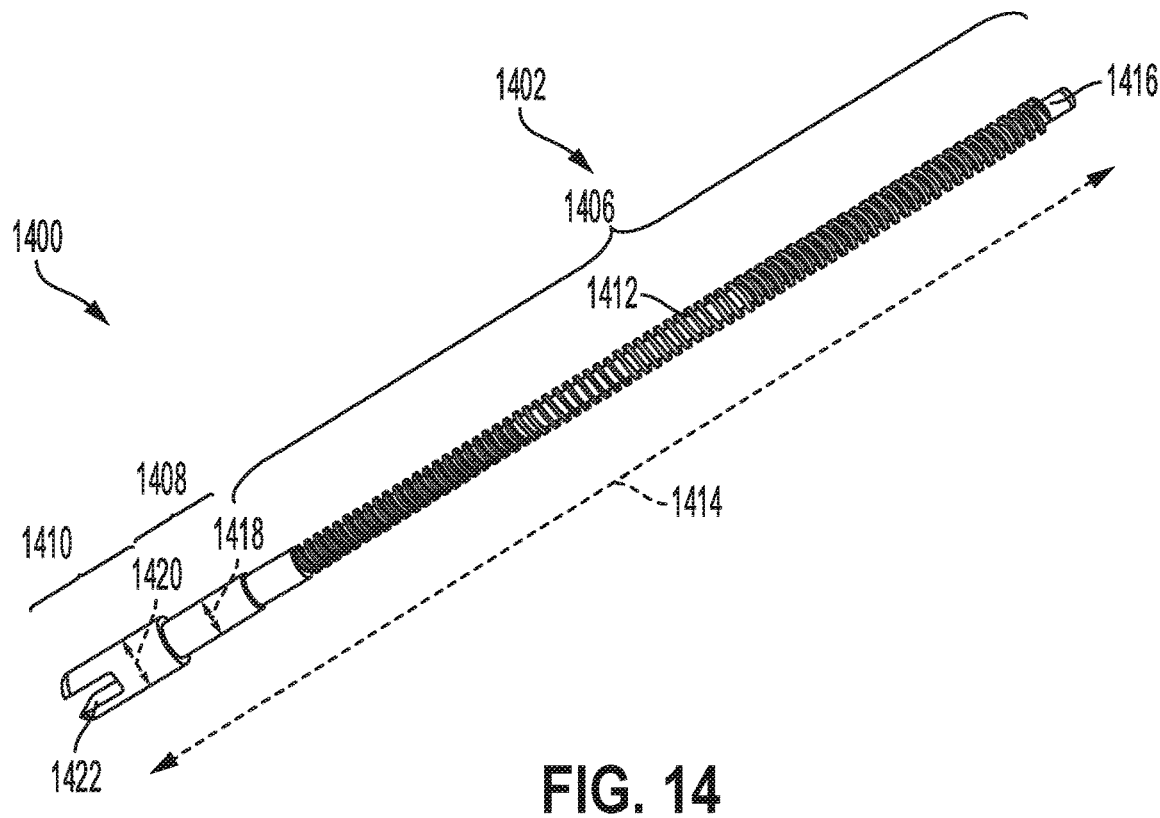
FIG. 14 shows an example of a threaded screw of a dual-gate mechanism.

The following description relates to systems and methods for a variable thermal capacity charge air cooler (VTC-CAC) to control a manifold charge temperature (MCT) and reduce a likelihood of condensation forming in an intake passage or intake manifold. The VTC-CAC may be included in an engine system, such as the exemplary engine system shown in FIG. 1. A first embodiment of the VTC-CAC, illustrated in FIG. 2 in a cross-section, may be configured with an integrated bypass and a dual-gate mechanism arranged in an inlet header tank of the VTC-CAC and actuated by a stepper motor. The dual-gate mechanism comprises a sliding gate that controls an amount of cooling channels open to air flow as well as a hinged gate that adjusts air flow through the integrated bypass. The sliding gate is shown in detail from a front view in FIG. 3 and its positioning above cooling channels of the VTC-CAC and coupling to a rotating screw controlling a movement of the sliding gate is shown from two different perspectives in FIGS. 4 and 5. A positioning of the hinged gate is also shown in FIGS. 4 and 5. A perspective view of the hinged bypass gate and a spherical bearing, providing a self-aligning property, disposed in the hinged bypass gate is shown in FIG. 6. Movement of both the sliding gate and the hinged gate, from a fully open position of the hinged gate, through a partially open position, to a fully closed position of the hinged gate is shown in FIGS. 7A-7C in cross-sections of the VTC-CAC. A method for adjusting the dual-gate mechanism of the VTC-CAC in response to the MCT is depicted in FIG. 8. A second embodiment of a VTC-CAC is shown in FIGS. 9-12 where a dual-gate mechanism of the VTC-CAC is disposed in an outlet header tank instead of the inlet header tank. The VTC-CAC is illustrated at FIG. 10 as a cut-away view of a front view shown in FIG. 9. As an alternative configuration of a dual-gate mechanism of a VTC-CAC, a threaded valve that replaces a hinged gate of the dual-gate mechanism may be used. Zoom-in views of the threaded valve in a first and a second position are depicted in FIGS. 11 and 12, respectively. A detailed view of the threaded valve is depicted in FIG. 13 and a detailed view of a threaded screw of the dual-gate mechanism is shown in FIG. 14.

FIGS. 1-7C and 9-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
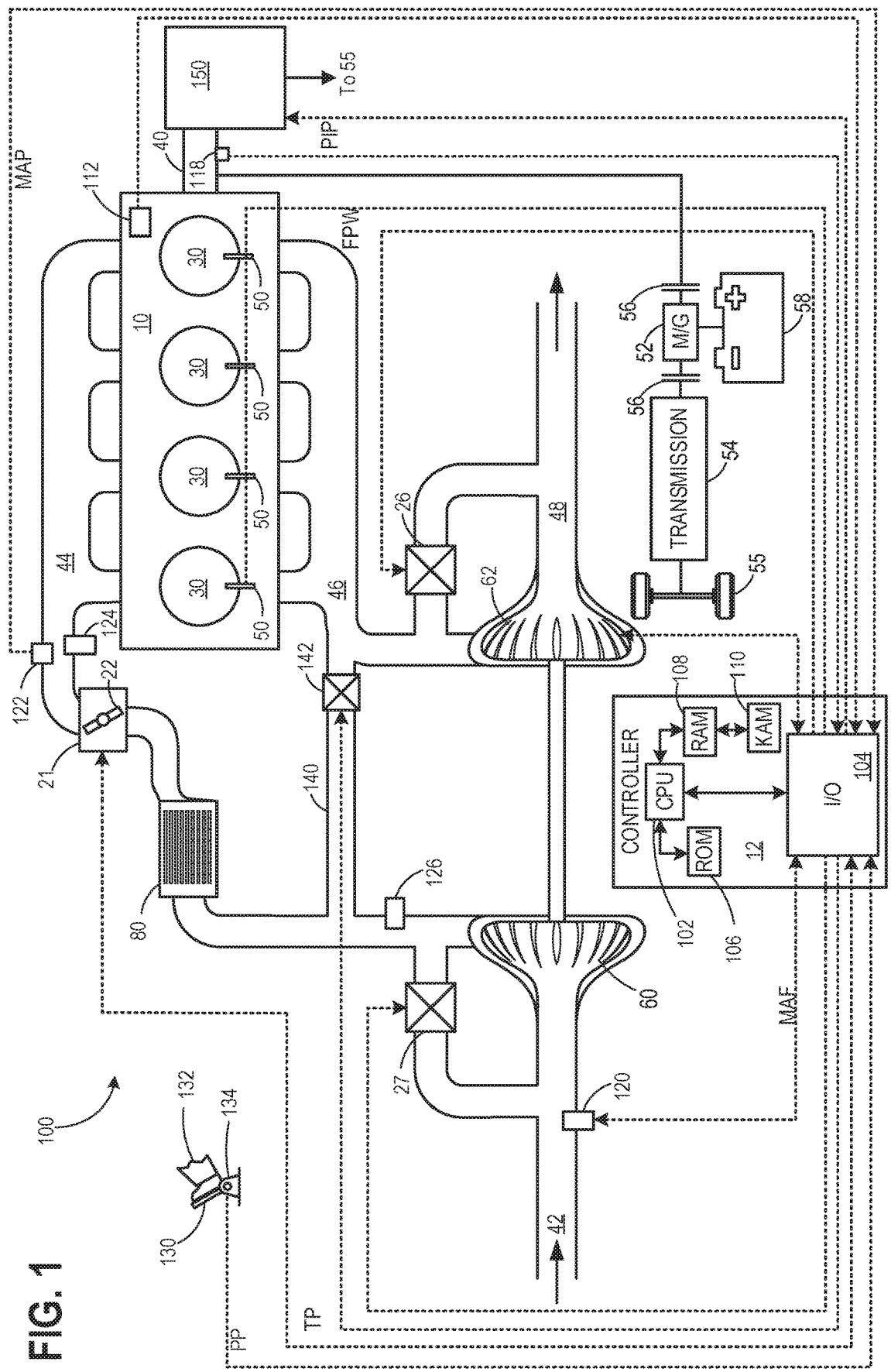
FIG. 1 is a schematic diagram of an example engine system including a charge air cooler.

FIG. 1 is a schematic diagram showing an example engine system 100, including an engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. As such, the pedal position signal may indicate a tip-in (e.g., sudden increase in pedal position), a tip-out (e.g., sudden decrease in pedal position or release of the accelerator pedal), and additional driving conditions.

Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel 55 of a vehicle via an intermediate transmission system 150. Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor bypass valve (CBV) 27 configured to divert intake air around compressor 60. Wastegate 26 and/or CBV 27 may be controlled by controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. Hot charge air from the compressor 60 enters the inlet of CAC 80, cools as it travels through CAC 80, and then exits to pass through the throttle 21 and then enter the engine intake manifold 44. Ambient air flow from outside the vehicle may enter engine 10 through a vehicle front end and pass across CAC 80, to aid in cooling the boosted air. Condensate may form and accumulate in CAC 80 when the ambient air temperature decreases, or during humid or rainy weather conditions, where the boosted air is cooled below the water dew point. Condensate may also accumulate in the intake passage 42 downstream of CAC 80, as well as in the intake manifold 44 as a result of cooling intake air below the dew point. Furthermore, a temperature of the charge air, e.g. compressed air cooled by the CAC 80, may decrease a manifold charge temperature (MCT) to an extent where engine performance may be degraded. Thus CAC 80 may be adapted as a variable thermal capacity charge air cooler (VTC-CAC), described herein with reference to FIGS. 2-7C.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa.

During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a manifold charge temperature (MCT) sensor 124 in the intake manifold 44, and a boost pressure sensor 126. Other sensors not depicted may also be present, such as a sensor for determining the intake air velocity at the inlet of the charge air cooler, for measuring charge air temperature at the CAC outlet, and other sensors. In some examples, storage medium read-only memory 106 may be programmed with computer readable data representing instructions executable by microprocessor unit 102 for performing the methods described below as well as other variants that are anticipated but not specifically listed.

In some examples, engine system 100 may be a hybrid engine system with multiple sources of torque available to one or more vehicle drive wheels 55. In other examples, engine system 100 is a conventional engine system with only an engine, or an electric engine system with only electric machine(s). In the example shown, engine system 100 includes engine 10 and an electric machine 52. Electric machine 52 may be a motor or a motor/generator. Crankshaft 40 of engine 10 and electric machine 52 are connected via a transmission 54 to vehicle drive wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2:
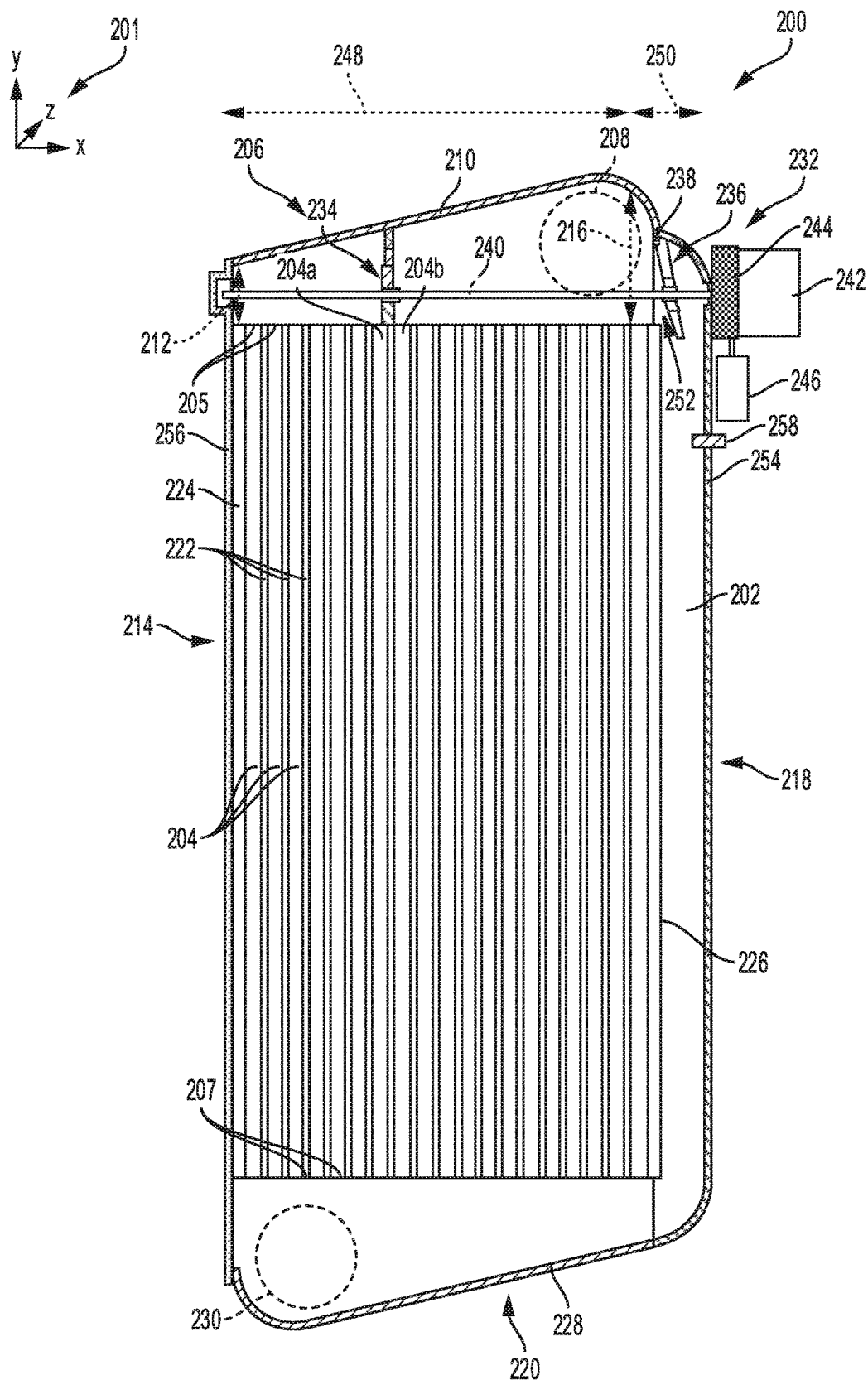
FIG. 2 shows a first example of a variable thermal capacity charge air cooler (VTC-CAC) including an integrated bypass and a dual-gate mechanism.

As shown in FIG. 1, an engine system may include a CAC, such as CAC 80, arranged downstream of a compressor to cool boosted air before combustion at the cylinders. To reduce a likelihood of cooling the air below a dew point, leading to an undesirable decrease in MCT and condensation in the CAC, intake passage, and intake manifold, the CAC may be adapted as a variable thermal capacity CAC (VTC-CAC) to adjust the portion of air, and thereby the MCT, that is cooled. A first example embodiment of a VTC-CAC 200 is depicted in FIG. 2 and includes an integrated bypass 202 and cooling channels 204. A set of reference axes 201 are provided for comparison between views shown in FIGS. 2-7C, indicating a "y" direction, "x" direction, and "z" direction. In some examples, the "y" direction may align with a vertical axis, the "x" direction with a horizontal axis, and the "z" direction with a lateral axis. However, other orientations have been contemplated. The view of the VTC-CAC is a cross-section taken along the plane formed by the "y" and "x" directions.

An outer shape of the VTC-CAC 200 may resemble a parallelogram with rounded corners, a greater length along the "y" direction than along the "x" direction, and without any planes of symmetry. In FIG. 2, the VTC-CAC 200 is shown aligned with the "y" direction so that the bypass 202 and the cooling channels 204 are parallel with the "y" direction. The VTC-CAC 200 may have a first header tank 206 positioned at a top end of the VTC-CAC 200, with respect to the "y" direction. The first header tank 206 may be a first chamber into which boosted air may enter through an inlet 208 that is proximal to the bypass 202 and may be coupled to an intake passage via a hose connected to the inlet 208. The first header tank 206 may have a top wall 210 that is angled with respect to the "x" direction so that a height 212 of the first header tank 206 at a first, cool side 214 of the VTC-CAC 200 is shorter than a height 216 at a second, warm side 218 of the VTC-CAC 200.

The first header tank 206 is fluidically coupled to each of the cooling channels 204, at first ends 205 of the cooling channels 204, and to the bypass 202. The cooling channels 204 may be a plurality of hollow tubes extending along the "y" direction from the first header tank 206 to a second header tank 220, arranged at an opposite end of the VTC-CAC 200 from the first header tank 206, and the cooling channels 204 fluidically couple the first header tank 206 to the second header tank 220. Inner volumes of the cooling channels 204 are separated by tube walls 222. The tube walls 222 may be configured with air fins attached to a front surface, e.g., a surface directly in contact with ram air. The cooling channels 204 are adjacently arranged so that each cooling channel shares two tube walls 222, and attached air fins, with adjacent cooling channels arranged on either side of the cooling channel except for the outermost cooling channels 204, e.g. the cooling channel proximal to a first side wall 224, also adapted with air fins, of the cool side 214 and the cooling channel adjacent to the bypass 202, that only share one tube wall and air fin with an adjacent cooling channel. The side-by-side cooling channels 204 extend from the first side wall 224 and air fin of the VTC-CAC 200 to an inner wall 226 of the bypass 202.

The bypass 202 may also extend from the first header tank 206 to the second header tank 220 and fluidically couple the first header tank 206 to the second header tank 220. The bypass 202 may provide an alternate route for air flow so that at least a portion of the air entering the VTC-CAC may be diverted from the cooling channels 204 and not cooled when the bypass 202 is open to air flow. The inner wall 226, as well as an outer wall 254, of the bypass 202 may be thicker than the tube walls 222 to reduce heat transfer from the warmed air passing through the bypass to the air flowing through the cooling channels 204. The inner wall 226 and outer wall 254 of the bypass 202 may also be formed from a less thermally conductive material than the cooling channels 204 of the VTC-CAC to provide an insulating effect. A width of the bypass 202, defined along the "x" direction, may be greater than a width of one of the cooling channels 204 but significantly narrower than a cumulative width of all of the cooling channels 204 of the VTC-CAC 200.

The bypass 202 may be configured to maintain a warm temperature of a portion of a boosted air mass flowing through the VTC-CAC 200. Glow plugs 258 may be optionally arranged within the bypass 202 to augment a temperature of the bypassed air. For example, during cold engine starts, the glow plugs 258 may increase the MCT for faster engine warming. As another example, the glow plugs 258 may assist in raising the MCT to a desirable temperature when flowing warmed air through a fully opened bypass 202 does not increase the temperature sufficiently.

At an outlet end of the VTC-CAC 200, the second header tank 220 is coupled to second ends 207 of the cooling channels 204 and to the bypass 202. The second header tank 220 is similarly but oppositely configured to the first header tank 206 with a bottom wall 228 that is angled so that a height of the second header tank 220, defined along the "y" direction and proximal to the warm side 218 of the VTC-CAC 200, is shorter than a height of the second header tank 220 proximal to the cool side 214. An outlet 230 is included in the second header tank 220 that may also be coupled to the intake passage via a hose so that the VTC-CAC is arranged as a section of the intake passage, e.g., in series with the intake passage. Air flowing through the cooling channels 204 and bypass 202 may combine in the second header tank 220 and exit the VTC-CAC 200 via the outlet 230. Cooling channels 204 to the left of the sliding gate 234 that are blocked to air flow may include stagnant mixed air from header tank 220, resulting in a consistently lower temperature of the air within the blocked cooling channels 204 than the air entering from the inlet 208. Returning to the first header tank 206 of the VTC-CAC 200, a dual-gate mechanism 232 may be disposed therein to control a division of air flow between the cooling channels 204 and the bypass 202. The dual-gate mechanism includes a sliding gate 234 that glides across the first ends 205 of the cooling channels 204 along the "x" direction, a hinged gate 236 adapted to pivot at a hinge 238, a threaded screw 240 extending from the cool side 214 to the warm side 218 of the VTC-CAC 200 in the first header tank 206, a stepper motor 242, a brake drum 244 housing a coil spring surrounded by a brake band (not shown in FIG. 2), and a solenoid 246.

Movement of the sliding gate 234 and hinged gate 236 may be actuated by the stepper motor 242 via coupling to the threaded screw 240 where rotational movement of the threaded screw 240 is translated into linear movement of the sliding gate 234 along the "x" direction and pivoting of the hinged gate 236 in a counter-clockwise direction, with respect to the view of the VTC-CAC 200 of FIG. 2. The movement of the sliding gate 234 and hinged gate 236 may occur simultaneously, actuated by rotation of the threaded screw 240. Thus independent movement of either the sliding gate 234 or the hinged gate 236 may not be performed by the dual-gate mechanism 232.

The stepper motor 242 may have a reduction gear fitted with a one-way clutch (not shown in FIG. 2) to decrease a likelihood of the stepper motor freewheeling during rotation of the threaded screw when tension on the brake band is released, described further below. The stepper motor 242 may drive rotation of the threaded screw 240 in a first direction that results in linear motion of the sliding gate 234 towards the warm side 218 of the VTC-CAC 200, hereafter referred to as a forward direction, and concurrent opening of the hinged gate 236 by pivoting in the counter-clockwise direction at the fixed hinge 238. As the threaded screw 240 rotates, the coil spring inside the brake drum 244 is wound up so that continued rotation of the threaded screw 240, moving the sliding gate in the forward direction while increasing the opening of the hinged gate 236, increases a tension of the coil spring. When the hinged gate 236 reaches a fully opened position, pivoting about the hinge 238, the coil spring may be under a maximum level of tension. The brake drum 244 may maintain the current tension on the coil spring and hold a position of the sliding gate 234 and hinged gate 236 at any time that the stepper motor 242 is stopped by engaging the brake band. The brake band may surround the coil spring and resist a tendency for the coil spring to relieve tension. The interaction with the brake band may also overcome any boosted air pressure influence during events where boosted air pressure may fluctuate and cause a pressure on the coil spring to fluctuate. The solenoid 246 may be activated while the stepper motor 242 is driving rotation of the threaded screw 240 to allow the brake drum 244 to rotate with the threaded screw 240. By moving along the threaded screw 240 in the forward direction, the sliding gate 234 decreases a total volume of the VTC-CAC 200 through which boosted air may flow and undergo heat transfer with the surfaces of the cooling channels 204. This may be achieved by a variable height of the sliding gate 234, described further below in FIGS. 3-5, which cuts off an inner volume of the first header tank 206, decreasing the volume of the first header tank 206 that is fluidically coupled to the intake passage through the inlet 208 as the sliding gate 234 is driven forwards by rotation of the threaded screw 240. The forward motion of the sliding gate 234 may also control the number of cooling channels 204 that are available to cool boosted air. As the sliding gate 234 slides along the forward direction, the number of cooling channels 204 open to air flow decreases.

The decrease in volume of the VTC-CAC 200 available to cool boosted air resulting from the forward motion of the sliding gate 234 may be at least partially offset by an opening of the hinged gate 236 to allow air to be diverted to the bypass 202. The simultaneous opening of the hinged gate 236 as the sliding gate 234 moves forward is also actuated by the stepper motor 242 and rotation of the threaded screw 240. Details of a configuration of the hinged gate 236 will be described further below, in FIGS. 4-6.

A distance that the hinged gate 236 may travel along the "x" direction, as the hinged gate 236 pivots, per full turn, e.g., 360 degree rotation, of the threaded screw 240 may be less than a distance travelled by the sliding gate 234 per full turn. The offset in distance travelled may be established by configuring the threaded screw 240 with different thread pitches. A first portion 248 of the threaded screw 240 may have a first pitch size that differs from a second pitch size of a second portion 250 of the threaded screw 240. The first portion 248 of the threaded screw 240 may extend from the cool side 214 of the VTC-CAC 200 to a bypass opening 252 at a point where the hinged gate 236 may be positioned when the hinged gate 236 is in a fully closed position, e.g. parallel with the "y" direction. The second portion 250 of the threaded screw 240 may extend across a width of the bypass 202, defined along the "x" direction, from the inner wall 226 of the bypass 202 to the warm side 218 of the VTC-CAC 200.

The offset in pitch size between the first pitch size of the first portion 248 and the second pitch size of the second portion 250 of the threaded screw 240 may be determined based on computational fluid dynamics (CFD) simulations. The first pitch size may be larger than then second pitch size according to a ratio, such as 10:1, that allows the sliding gate 234 to travel a larger distance relative to hinged gate 236 along the "x" direction per full turn of the threaded screw 240. Furthermore, the offset in pitch sizes may be adapted to allow a full opening of the hinged gate 236, which may be a maximum distance the hinged gate 236 may travel in the forward direction while pivoting that is halted by contact of the hinged gate 236 with the outer wall 254 of the bypass 202, to coincide with a minimum number of cooling channels 204 to be maintained open under any engine operating conditions as controlled by the position of the sliding gate 236. In other words, adjustment of the hinged gate 236 to the fully opened position, as shown in FIG. 7A, may stop the rotation of the threaded screw 240 and therefore stop the movement of the sliding gate 234 in the forward direction, along the first ends 205 of the cooling channels 204. This terminal point of movement of the sliding gate 234 may be a maximum distance the sliding gate 234 may travel in the forward direction and as a result, the cooling channels 204 with openings in front of this position may constantly be open to air flow.

The pitch sizes of the first and second portions 248, 250, of the threaded screw 240 may be configured so that a minimum number of cooling channels 204 are kept open when the hinged gate 236 is fully opened to maintain a desirable distribution of air flow between the cooling channels 204 and the bypass 202. The minimum number of cooling channels 204 maintained open may also depend on a size and location of the inlet 208. For example, if the inlet 208 were shifted proximal to a central region of the first header tank 206, the sliding gate 234 may slide towards the cool side 214 of the VTC-CAC 200 to a maximum distance that aligns with a leftmost edge of the inlet 208. This results in a greater number of cooling channels 204 maintained open. This controlled distribution may also conserve a pressure ratio across the inlet 208 and the outlet 230 of the VTC-CAC 200, thereby decreasing a likelihood of a change in pressure of air passing through the VTC-CAC 200.

By driving the sliding gate 234 forward and the hinged gate 236 more open, more air is diverted to the bypass 202 and less air is cooled through the cooling channels 204. An increased routing of air through the bypass 202 may be desired when the manifold charge temperature (MCT) approaches a threshold such as a dew point. However, when the MCT rises and increased cooling of boosted air is desired, the sliding gate 234 may be moved along the "x" direction from the warm side 218 to the cool side 214 of the VTC-CAC, in a reverse direction that is opposite of the forward direction, and the opening of the hinged gate 236 decreased by pivoting the hinged gate 236 in a clockwise direction.

Movement of the sliding gate 234 in the reverse direction and hinged gate 236 in the clockwise direction may be provided by deactivating the stepper motor 242 and disengaging the brake band holding the coil spring in place within the brake drum 244 by actuating the solenoid 246. The movement of the sliding gate 234 and hinged gate 236 in opposite directions from those described above may also occur simultaneously, as controlled by rotation of the threaded screw 240, albeit in an opposite direction. The solenoid releases the brake band and the tension on the coil spring causes the coil spring to unwind, rotating the threaded screw 240 in second direction opposite of the first rotational direction imposed by the stepper motor 242. The one-way clutch in the stepper motor reduction gear allows the rotation of the threaded screw 240 in the second direction without freewheeling the stepper motor 242. The sliding gate 234 and hinged gate 236 travel along the reverse and clockwise directions, respectively, until a desired proportioning of air between the cooling channels 204 and the bypass 202 is attained, determined based on a desired MCT. The deactivation of the solenoid 246 re-engages the brake band with the coil spring when the sliding gate 234 and hinged gate 236 are adjusted to the desired position and the position of the sliding gate 234 and hinged gate 236 is maintained.

Furthermore, if the stepper motor 242 is degraded, the dual-gate mechanism 232 may be configured to actuate the solenoid in response to the detected degradation, releasing the brake band. The hinged gate 236 may be pivoted to the fully closed position, as shown in FIG. 7C, with the sliding gate 234 positioned against an outer wall 256 of the cool side 214 of the VTC-CAC 200. This allows for a maximum number of cooling channels 204 to be open to air flow, thus providing a maximum amount of cooling to the boosted air and reducing a likelihood of an increase in MCT while a performance of the stepper motor 242 is degraded, hence a default position of the VTC-CAC 200 when function of the stepper motor 242 is compromised provides maximum boosted air cooling.

In this way, the VTC-CAC may vary a cooling capacity of boosted air delivered to the engine intake by dividing air flow between the cooling channels and the bypass to achieve the desired MCT. The cooling effect of the VTC-CAC is controlled by a single mechanism that adjusts the inner volume of the VTC-CAC that provides cooling of a first portion of the air as well as the opening of the bypass that maintains a higher temperature of a second, bypassed portion of the air. Mixing of the air within the second header tank at the outlet end of the VTC-CAC generates a temperature that falls between the individual temperatures of the first and second portions. By controlling the MCT via variable cooling, an engine's combustion efficiency may be increased while emissions of carbon monoxide and hydrocarbons as well as condensation within the engine intake are reduced.

It will be appreciated that while the embodiment of the VTC-CAC and components of the VTC-CAC shown in FIGS. 2-7C are depicted with certain geometries and amounts of components, other shapes, sizes, and quantities have been contemplated. For example, an outer shape of the VTC-CAC may resemble a rectangle or a square instead of a parallelogram, the alignment of the cooling channels and bypass within the VTC-CAC may vary relative to the outer geometry, the number cooling channels may be more or less than those shown, the width of the bypass may be wider or narrower than the bypass shown, etc. Thus, it will be appreciated that such deviations from the example embodiments shown should not depart from the scope of the present disclosure.

The VTC-CAC 200 is imparted with a variable thermal capacity by adjusting positions of the sliding gate 234 and hinged gate 236 so that the sliding gate 234 blocks air flow through a desired number of cooling channels 204. Aspects of the sliding gate 234 will be discussed with reference to FIGS. 3-5 regarding how the sliding gate 234 seals off a portion of the cooling channels 204. Elements introduced in FIG. 2 are similarly numbered.

Figure 3:
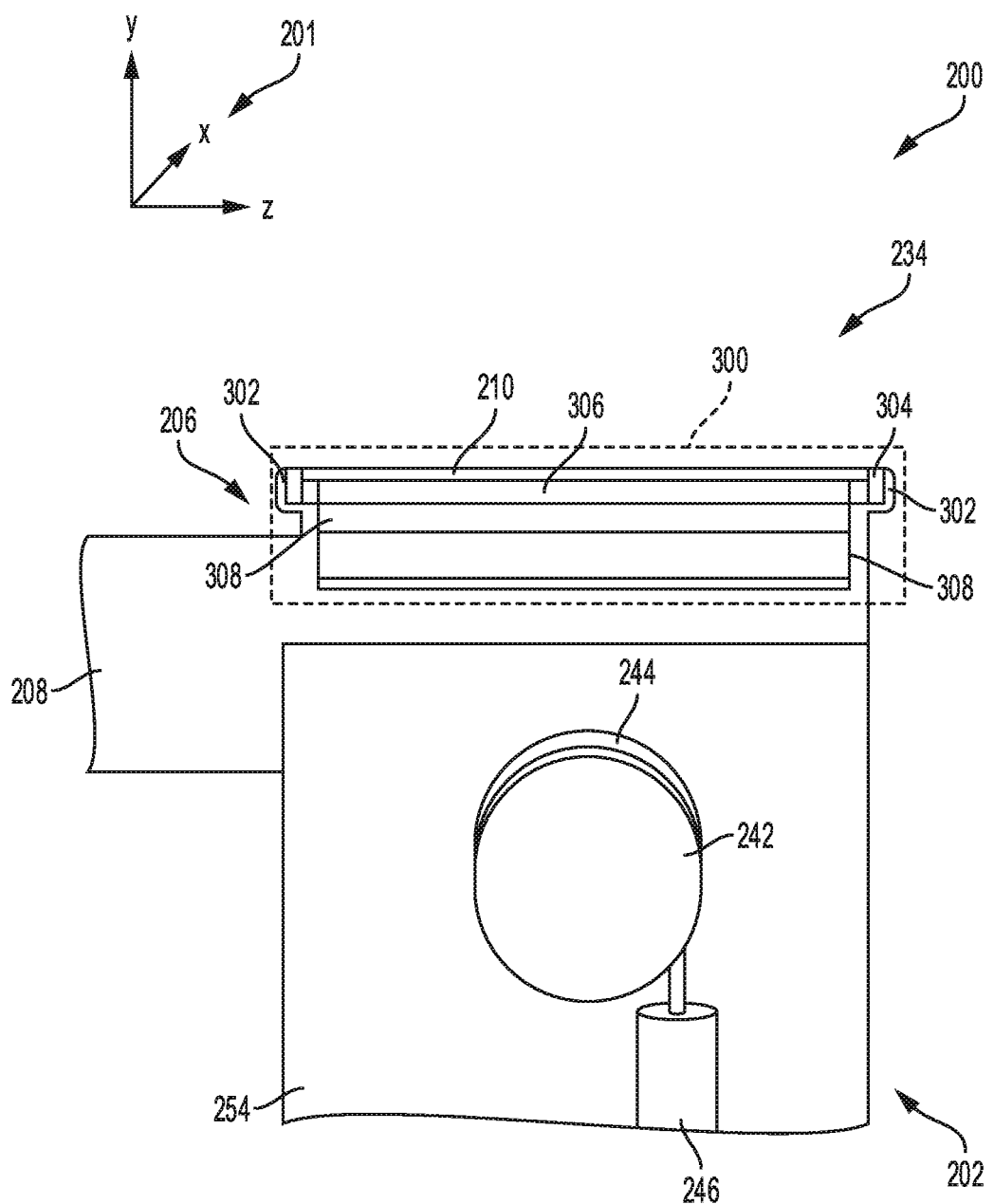
FIG. 3 shows a front view of a sliding gate of the dual-gate mechanism of the VTC-CAC.

The VTC-CAC 200 is shown in FIG. 3 from a direction that provides a front view of the sliding gate 234, e.g. along the "z" direction, viewing the sliding gate 234 along the "x" direction from the warm side 218 to the cool side 214 of the VTC-CAC 200. While outer surfaces of the stepper motor 242, the bypass 202 and the inlet 208 in the first header tank 206 are shown, a cut-away view of an upper portion of the sliding gate 234, housed within the first header tank 206, is shown in box 300. A top edge 306 of the sliding gate 234 may be in contact with an inner face of the top wall 210 across an entire depth of the inner face of the top wall 210, the depth defined along the "z" direction. Sides 308 of the sliding gate 234, the sides being coaxial with the "z" direction, may be in contact with inner side surfaces of the first header tank 206 along an entire height of the sliding gate 234, with the height defined along the "y" axis. The top wall 210 of the first header tank 206 may be cast with rails 302 protruding from sides of the first header tank 206 and extending along a width of the header tank, defined along the "x" direction, to accommodate and enclose high temperature bearings 304 of the sliding gate 234.

The high temperature bearings 304 may be configured to allow movement of the sliding gate 234 along the "x" direction while maintaining contact between the top edge 306 of the sliding gate 234 and the inner surface of the top wall 210 of the first header tank 206 via nested sections, described further below. The high temperature bearings 304 may be connected proximal to the top edge 306 of the sliding gate 234 and arranged along the sides 308 of the sliding gate 234. The high temperature bearings 302 may protrude from the sides 308 of the sliding gate 234 to be positioned and fixed with the rails 304. The sliding gate 234 may thus slide unhindered along the "x" direction in the first header tank 206 by rolling of the high temperature bearings 304 within the rails 302 of the first header tank 206. As the threaded screw 240 rotates, the sliding gate 234 moves along the threaded screw 240 by interaction between a first threaded insert 404 disposed in the sliding gate 234, shown in FIGS. 4-5 and described below, and the threaded screw 240. The high temperature bearings 304 allow an upper portion of the sliding gate 234 to move along the "x" direction while maintaining a vertical, e.g., parallel with the "y" direction, alignment of the sliding gate 234. The contact between the top edge 306 and the sides 308 of the sliding gate 234 with the inner face of the top wall 210 and inner side surfaces of first header tank 206 seals a portion of the inner volume of the first header tank 206 between a distance, along the "x" direction, from the sliding gate 234 to the outer wall 254 of the bypass 202.

The high temperature bearings 304 may be located at a warmest region of the VTC-CAC 200, within a top region of the first header tank 206 where warmed boosted air first enters the VTC-CAC 200. In one example, the high temperature bearings 304 may be formed from a material with a high heat tolerance such as silicon nitride, zirconia, or silicon carbide that allow movement of the high temperature bearings 304 without lubrication. The sliding gate 234 may also comprise a second set of bearings that may also be configured to roll within a second set of rails arranged proximal to a bottom edge of the sliding gate 234 and cast into the sides of the first header tank 206, extending along the width (e.g., along the "x" direction) of the VTC-CAC 200. The second set of bearings are shown in the perspective views 400 and 500 of the VTC-CAC 200 depicted in FIGS. 4 and 5.

The perspective views 400 and 500 of FIGS. 4 and 5 show the VTC-CAC 200 with the dual-gate mechanism 232 arranged above a CAC core 402 that includes the cooling channels 204 and tube walls 222 and attached air fins. The first header tank 206 is omitted from both FIGS. 4 and 5 and the bypass 202 is omitted from FIG. 4. The sliding gate 234 of the dual-gate mechanism 232 may have a rectangular outer shape with a second set of bearings 406 arranged along the sides 308 of the sliding gate 234 and proximal to a bottom edge 408 of the sliding gate 234, the bottom edge 408 being parallel with the top edge 306. The sliding gate 234 may be formed from a rigid material with a high heat tolerance and marginal thermal expansion, such as aluminum, carbon graphite, bronze, or composite. It will be appreciated, however, that the sliding gate 234 is a non-limiting example and other examples of the sliding gate may comprise outer shapes of different sizes and geometries, depending on an inner shape of the first header tank, or formed from other rigid materials.

The second set of bearings 406 may function similarly to the high temperature bearings 304, allowing the bottom edge 408 of the sliding gate 234 to slide unhindered along a width of the first header tank 206 when compelled by rotation of the threaded screw 240 while maintaining the upright position of the sliding gate 234. The second set of bearings 406 may be enclosed within rails, similar to the rails 302 of FIG. 3, disposed in the sides of the first header tank 206 and may be formed of a same material as the high temperature bearings 304.

The bottom edge 408 of the sliding gate 234 may be in contact along an entire depth, defined along the "z" direction, with an upper surface 410 of the CAC core 402 in which first ends 205 of the cooling channels 204 are disposed. One or more rows of the cooling channels 204, the rows also defined along the "z" direction, may thereby be blocked by the sliding gate 234. For example, returning to FIG. 2, the sliding gate 234 may have a thickness, defined along the "x" direction" that is at least equal to diameters of the cooling channels 204 (measured along the "x" direction) and therefore may fully block one row of the cooling channels 204 when positioned directly above the row. In other words, if the sliding gate 234 were arranged directly over cooling channel 204a of FIG. 2 (representing one row of the cooling channels 204), the cooling channels 204 in front of sliding gate 234, including all the cooling channels 204 from the cooling channel proximal to the bypass 202 up to cooling channel 204b (also representing one row of the cooling channels 204), are not blocked. Therefore cooling channel 204b and all the cooling channels 204 in front of cooling channel 240b are open to air flow and cooling channel 204a and all the cooling channels 204 behind cooling channel 204a, and including cooling channel 204a, are blocked to air flow. In another example, the sliding gate 234 may be positioned so that the thickness of the sliding gate 234 extends partially across a diameter of cooling channel 204a as well as partially across a diameter of cooling channel 204b. In this position, cooling channel 204b and all the cooling channels 204 in front are again open to air flow, although flow through cooling channel 204b may experience restriction, while cooling channel 204a and all the cooling channels behind cooling channel 204a are blocked.

The sliding gate 234 may maintain a sealing interaction with inner surfaces of the first header tank 206, in spite of the variable height of the first header tank 206, as shown in FIG. 2, by comprising sections that nest within one another. In FIGS. 4 and 5, the sliding gate 234 includes a first section 412 that is a largest section of the sliding gate 234 in which the first threaded insert 404 is centrally arranged, a second section 414 above the first section 412, and a third section 416 above the second section 414 that includes the top edge 306 of the sliding gate 234 and the high temperature bearings 304. A size (including a thickness, defined along the "x" direction, and a depth, defined along the "z" direction) of the second section 414 may be smaller than a size of the first section 412 so that the second section 414 may fit within and be at least partially enclosed by the first section 412. In other words, the second section 414 may be adapted to nest within the first section 412 and slide up and down, along the "y" direction, relative to first section 412. The upward sliding of all nested sections may be halted at an end of their travel by lock pins on either side of each section, along the "z" direction (not shown), which allows the uppermost third section 416 to drive the vertical motion of the slideable sections below (e.g., the second section 414). A structural integrity of the assembly is thus maintained when the high temperature bearings 304 slide in their perspective rails 302 to conform to the cross-sectional area of the first header tank 206. The downward sliding of the second section 414, however, may be halted by contact with a flat-machined surface 411 in the first section 412 of the sliding gate 234. The third section 416 may be similarly configured to nest within the second section 414 and slide up and down relative to the second section 414, with the downward motion halted by contact with a flat-machined surface 413 of the second section 414 (as shown in FIG. 5).

In this way, a height 418 of the sliding gate 234 may be adjusted according to changes in height of the first header tank 206 as the sliding gate 234 moves along the forward and reverse directions. Contact between the top edge 306 of the sliding gate 234 and the inner face of the top wall 210 of the first header tank 206 is maintained by confinement of the high temperature bearings 304 within the rails 302 of the first header tank 206, as shown in FIG. 2. As the height of the first header tank 206 changes along the width of the first header tank 206, the third section 416 may slide in and out of the second section 414, which may slide in and out of the first section 412 of the sliding gate 234, providing expansion and contraction of the height 418. By matching the height 418 of the sliding gate 234 with the height of the first header tank 206, the sliding gate 234 may seal and block an inner volume of the VTC-CAC 200, defined by a volume of the first header tank 206 that is behind the sliding gate 234 and by a number of the cooling channels 204 that are behind the foremost cooling channel blocked by the sliding gate 234, from air flow, simultaneously controlling the number of cooling channels 204 available to cool boosted air. It will be appreciated that while three sections of the sliding gate 234 are shown in FIGS. 4 and 5, different quantities of nesting sections have been contemplated, such as two sections, four sections, or five sections. Furthermore in embodiments of the VTC-CAC 200 where the first header tank has a uniform height, the sliding gate may include a single section that does not vary in height.

The first section 412 of the sliding gate 234 may have a central aperture, extending through the thickness of the first section in which the first threaded insert 404 is disposed. The first threaded insert 404 may be annular with a threaded inner surface configured to mate with the pitch size of the first portion 248 of the threaded screw 240. The first threaded insert 404 may be fixed to the first section 412 so that the first threaded insert 404 may not rotate. When the threaded screw 240 is turned by the stepper motor 242, the threaded screw 240 is held in place while rotating, e.g., the threaded screw 240 does not move translationally. Instead, the mating of the threading in the inner surface of the first threaded insert 404 with the thread pitch of the first portion 248 of the threaded screw 240 converts the rotational movement of the threaded screw 240 into translational movement of the sliding gate 234 in the forward direction.

The rotation of the threaded screw 240 may also drive movement of the hinged gate 236. The hinged gate 236 may have a rectangular shape, as shown in FIGS. 2 and 4, as well as a perspective view 600 of FIG. 6, showing the arrangement of the hinged gate 236 in the VTC-CAC 200 with the bypass 202 omitted. The hinged gate 236 may have a depth, defined along the "z" direction, equal to the depth of the first header tank 206 so that side edges 504 of the hinged gate 236 are in contact with side walls 502 of the bypass 202. In one example, a height of the hinged gate 236, defined along the "y" direction, may be slightly greater than a height of the first header tank 206 at the point where the hinge 238 of the hinged gate 236 is attached to the side walls 502 of the bypass 202. In other examples, however, the hinged gate 236 may have a different shape that corresponds to an inner geometry of the bypass 202. Unlike the sliding gate 234, the hinged gate 236 may not maintain an alignment that is parallel with the "y" direction as the hinged gate moves. The hinged gate 236 may pivot in the counterclockwise direction at the hinge 238 to increase the bypass opening 252 while the sliding gate 234 is moving along the forward direction as guided by the threaded screw 240.

An angle of the hinged gate 236 with respect to the "y" direction may increase as the bypass opening 252 is widened. The angle may vary between 0 degrees when the hinged gate 236 is in the fully closed position up to 30 degrees, in one example, when the hinged gate 236 is in the fully open position and a bottom edge 420 of the hinged gate 236 is in contact with the outer wall 254 of the bypass 202. In other examples, however, the range of angles through which the hinged gate 236 may pivot may vary according to a width of the bypass, defined along the "x" direction, a height of the hinged gate 236, or a positioning of a second threaded insert 422 in the hinged gate 236.

The second threaded insert 422 may be similarly configured as the first threaded insert 404, having an annular shape and comprising a threaded inner surface that mates with the pitch size of the second portion 250 of the threaded screw 240. The second threaded insert 422 may be fixed so that it may not rotate within a spherical bearing 424 that circumferentially surrounds the second threaded insert 422, as shown in FIGS. 4-6. The spherical bearing 424 may be modified such that an inner sphere of the spherical bearing 424 that houses the second threaded insert 422 is restricted from rotating in the same direction of the threaded screw 240 through the insertion of a small pin in the inner sphere that floats in a groove in an outer part of the spherical bearing 424. The second threaded insert 422 and the spherical bearing 424 may be disposed in an aperture extending through a thickness, defined along the "x" direction, of the hinged gate 236. As the hinged gate 236 is pivoted more open and the angle of the hinged gate 236 increases with respect to the "y" axis, an angle between the plane of the hinged gate 236 and the threaded screw 240 may decrease. A position of the second threaded insert 422 is fixed within the spherical bearing 424, therefore the rotation of the threaded screw swivels the spherical bearing 424, as indicated by arrow 602, which in turn accommodates the change in angle between the hinged gate 236 and the threaded screw 240 without imposing stress on the hinged gate 236 or threaded screw 240. The hinge 238 is housed in bypass 202 within a slightly oversized groove to allow a degree of freedom in the "y" direction when hinged gate 236 pivots from the fully closed to the fully opened position.

The spherical bearing 424 and second threaded insert 422 may be centrally disposed in the hinged gate 236. However, in other examples the spherical bearing 424 and second threaded insert 422, as well as the first threaded insert 404, may be offset from a center of the hinged gate 236 and sliding gate 234, respectively. The threaded screw 240 may be positioned higher, lower or biased to one side and the apertures in the hinged gate 236 and sliding gate 234 may be accordingly adjusted. Furthermore, the first and second threaded inserts 404, 422, and spherical bearing 424 may be formed from a heat tolerant material such as stainless steel.

A cut-out 426 may be disposed in a surface of the hinged gate 236 facing the cool side 214 of the VTC-CAC 200 and proximal to the bottom edge 420 of the hinged gate 236. The thickness of the hinged gate 236 may be reduced at the cut-out 426 to allow the hinged gate 236 to form a sealing engagement with the CAC core 402 when the hinged gate 236 is in the fully closed position. As shown in FIG. 7C, the cut-out 426 may be in face-sharing contact with the inner wall 226 of the bypass 202 in the fully closed position of the hinged gate 236. The reduced thickness of the cut-out 426 allows the hinged gate 236 to be parallel with the "y" direction when closed and blocks air from flowing into the bypass 202 under the bottom edge 420 of the hinged gate 236.

The hinged gate 236 may be further sealed by a sealing strip 428 arrange along a top edge 430 of the hinged gate 236 and extending across the depth of the hinged gate 236. The sealing strip 428 may extend along the "y" direction from a top edge 430 of the hinged gate 236 to an inner face of the outer wall 254 of the bypass 202. The sealing strip 428 may be formed from a flexible, heat resistant material such as rubber or silicone, the flexibility of the sealing strip 428 allowing it to maintain a sealing contact between the top edge 430 of the hinged gate 236 and the inner face of the outer wall 254 of the bypass 202 regardless of the angle of the hinged gate with respect to the "y" direction. In this way, air in the first header tank 206 may enter the bypass 202 by flowing under the bottom edge 420 of the hinged gate 236 and not around the side edges 504 or over the top edge 430 of the hinged gate 236.

The concerted positioning of the sliding gate 234 and hinged gate 236 when the threaded screw 240 is rotated by the stepper motor 242 to adjust flow through the cooling channels 204 and the bypass 202 of the VTC-CAC 200 or when stepper motor 242 is deactivated and the brake band released to allow movement in the reverse direction is represented by positions shown in FIGS. 7A-7C. Cross-sections of the VTC-CAC 200, taken along plane formed by the "y" and "x" directions, are depicted. The sliding gate 234 may include, along the first section 412, second section 414, and third section 416, a fourth section 710 positioned above the third section 416 and configured to nest with the third section 416. The high temperature bearings 304 may be attached to the fourth section 710 instead of the third section 416 in FIGS. 7A-7C.

In a first position 700 of FIG. 7A, the sliding gate 234 may be at a first mid-point 702 of the first portion 248 of the threaded screw 240, between the inner wall 226 of the bypass 202 and the outer wall 256 of the cool side 214 of the VTC-CAC 200. The hinged gate 236 may be in the fully open position, e.g., the bypass opening 252 is at a maximum, with the bottom edge 420 in contact with the outer wall 254 of the bypass 202. The thread pitches of the first and second portions 248, 250 of the threaded screw 240 may be configured so that the fully open position of the hinged gate 236 may coincide with the forward movement of the sliding gate 236 terminating at the first position 700 that maintains a minimum number of cooling channels 204 open to air flow. This may represent a constant minimum amount of cooling provided by the VTC-CAC 200 in addition to a maximum amount of air that may bypass the cooling channels 204. In one example, the minimum number of cooling channels to be maintained open may be set based on a calculated minimum amount of warming imposed by compression of intake air and difference between the minimum amount of warming and a desired MCT. In the example shown, less than half but greater than one quarter of the cooling channels may be maintained open when the dual-gate mechanism is in the first (e.g., fully open) position. However, in other examples, the minimum number of open cooling channels 204 may be determined by a physical constraint. As one example, a maximum distance the sliding gate may travel in the forward direction is set by alignment with the edge of the inlet 208 proximal to the warm side 214 of the VTC-CAC 200.

A second position 720 of the dual-gate mechanism 232 of the VTC-CAC is shown in FIG. 7B. The second position 720 includes a partially open position, e.g., between the fully open and the fully closed positions, of the hinged gate 236. The sliding gate 234 may be at a second mid-point 704 along the first portion 248 of the threaded screw 240. The second mid-point 704 may be closer to the cool side 214 of the VTC-CAC than the first mid-point 702 of FIG. 7A and may correspond to a position of the hinged gate 236 that is less open than the fully open position of FIG. 7A. The hinged gate 234 forms a larger angle relative to the threaded screw 240 compared to the angle between the hinged gate 234 and the threaded screw 240 in the first position 700 and the spherical bearing 424 in the hinged gate 234 may rotate to accommodate the change in angle. In the second position 720 of FIG. 7B, a greater number of cooling channels 204 are open to air flow than in the first position 700 of FIG. 7A and less air may be diverted through the bypass 202 due to a narrower bypass opening 252 in the second position 720.

Actuation of the dual-gate mechanism 232 from the first position 700 to the second position 720 may occur when increased cooling of the intake air is requested, such as during events where the MCT is detected to increase (e.g., above a threshold temperature). Greater cooling of the boosted air may be desirable to lower the MCT temperature and, in response to the rise in MCT, the stepper motor 242 may be deactivated and the solenoid 246 actuated to release the brake band in the brake drum 244 that maintains tension on the coil spring. The release of tension on the coil spring allows the threaded screw 240 to rotate in the second direction, driving the sliding gate 234 along the reverse and hinged gate 236 along the clockwise direction until the number of open cooling channels 204 and the bypass opening 252 reach a position that is determined to produce a portioning of warm and cool air to produce the desired decrease in MCT.

Conversely, actuation of the dual-gate mechanism 232 from the second position 720 to the first position 700 may occur when decreased cooling of the intake air is requested, such as when the MCT is detected to decrease (e.g., to below a threshold). To increase the MCT, the stepper motor 242 may be activated to turn the threaded screw in the first direction to reduce the number of cooling channels 204 open to air flow and widen the bypass opening 252 to divert more air to the bypass 202. The mixture of air in the second header tank 220 may comprise a greater portion of warm air in the first position 700 than obtained from the second position 720, thus delivering a warmer mixture of boosted air and raising the MCT.

It will be appreciated that the second position 720 of FIG. 7B is a non-limiting example of a position in between the fully open and fully closed positions of the hinged gate 236 and the corresponding position of the sliding gate 234. In other examples, the hinged gate 236 and sliding gate 234 may be adjusted to any position in between the fully open and fully closed positions of the hinged gate 236 and corresponding positions of the sliding gate 234 to vary air flow between the cooling channels 204 and bypass 202. Thus a continuum of adjustments to the MCT may be achieved.

The fully closed position of the hinged gate 236 is depicted in a third position 740 of the dual-gate mechanism 232 in FIG. 7C. The hinged gate 236 may be adjusted so that the cut-out 426 of the hinged gate 236 is in face-sharing contact with a surface of the inner wall 226 of the bypass 202 that is facing the warm side 218 of the VTC-CAC 200. The fully closed position of the hinged gate 236 may correspond to a position to the sliding gate 234 where the sliding gate 234 is shifted to a maximum extent toward the cool side 214 of the VTC-CAC 200. The sliding gate may be in contact with the outer wall 256 of the cool side 214 and all the cooling channels 204 may be open to air flow. This position may allow a greatest level of cooling of boosted air provided by the VTC-CAC 200 by closing the bypass 202 and directing all the intake air through the cooling channels 204.

The adjustment of the dual-gate mechanism 232 to the third position 740 of FIG. 7C may occur when the MCT is determined to be high enough that a likelihood of engine knock is increased. The stepper motor 242 is deactivated or maintained deactivated, the solenoid 246 is actuated to release the brake band, and the release of tension on the coil spring drives the rotation of the threaded screw 240 in the second direction. The sliding gate 234 travels along the reverse direction and the hinged gate 236 pivots in the clockwise direction until movement is terminated by contact between the sliding gate 234 and the outer wall 256 of the cool side 214 of the VTC-CAC 200 and between the cut-out 426 of the hinged gate 236 and the surface of the inner wall 226 of the bypass 202. All the air delivered through the intake passage may be cooled by the cooling channels 204 of the VTC-CAC 200, resulting in a decrease in the MCT.

Alternatively, the dual-gate mechanism 232 may be adjusted to the third position 740 if the stepper motor 242 is detected to malfunction. While over-cooling of the intake air may reduce combustion efficiency, degradation of engine components is more significant during overheating of the engine than during over-cooling. Thus, by setting the fully closed position of the hinged gate 236 as a default position when the stepper motor 242 is unable to drive the sliding gate 234 and hinged gate 236 along the forward direction, an increase in MCT is circumvented.

The manifold charge temperature (MCT) may be adjusted to a temperature that increases engine efficiency, reduces a likelihood of engine knock and formation of condensation in the intake region of the engine, and decreases emissions of carbon monoxide and hydrocarbons. Regulation of the MCT may be achieved by a variable thermal capacity charge air cooler (VTC-CAC), such as the VTC-CAC 200 of FIGS. 2-7C, configured with an integrated bypass and a dual-gate mechanism, e.g., the dual-gate mechanism 232 of FIGS. 2-7C. A method 800 for operating an engine system comprising the VTC-CAC adapted with the integrated bypass and dual-gate mechanism is provided in FIG. 8. Instructions for carrying out method 800 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 802, the method includes estimating and/or measuring the operating conditions of the engine. These may include, for example, an engine coolant temperature (ECT) measured by a temperature sensor such as temperature sensor 112 of FIG. 1 and the manifold charge temperature (MCT) detected by a temperature sensor in an intake manifold of the engine, such as temperature sensor 124 of FIG. 1. A pressure of boosted air may be measured by a pressure sensor, such as pressure sensor 126 of FIG. 1 and compared to a manifold absolute pressure (MAP), measured by another pressure sensor, such as manifold pressure sensor 122 of FIG. 1, to monitor changes in pressure across the VTC-CAC. A position of the dual-gate mechanism may be detected by sensors arranged the hinged gate of the mechanism or by an encoder installed on the threaded screw. Alternatively, the encoder may be positioned at the stepper motor to detect positions of the sliding gate and hinged gate at any instant. Other operating conditions determined may include a mass airflow into the intake system, ambient temperature, ambient humidity, and barometric pressure.

The method may determine at 804 whether the measured MCT falls below a first temperature threshold. In one example, the first temperature threshold may be a temperature at which a likelihood of engine knock and release of NOx emissions is increased when the MCT rises above the second temperature threshold. The first temperature threshold may therefore be an upper boundary of a temperature range through which engine operation is at a desirable combustion efficiency, fuel efficiency, and performance. This may be a value programmed into the controller's memory and may depend on specific characteristics of the engine.

If the MCT is measured below the first temperature threshold, the method continues to 806 where the stepper motor is deactivated, e.g., turned off, or maintained deactivated if the stepper motor is already off. At 808, the solenoid, coupled to the stepper motor, is activated to release the brake band, thereby allowing tension on a coil spring to be alleviated. The release of tension on the coil spring causes a threaded screw of the dual-gate mechanism to rotate in a direction that drives a linear movement of a sliding gate in a reverse direction, e.g., from a warm side to a cool side of the VTC-CAC. The direction of rotation of the threaded screw that drives the movement of the sliding gate in the reverse direction is the second direction described above with respect to FIGS. 2-7C. Concurrently, the rotation of the threaded screw also compels a closing of a hinged gate to block an opening to the integrated bypass. When the dual-gate mechanism reaches a fully closed position of the hinged gate, the sliding gate also reaches a maximum distance that the sliding gate may travel across the VTC-CAC, towards the cool side, and the solenoid is deactivated at 810. At 812, intake air is flowed through all the cooling channels of the VTC-CAC and no intake air flows through the integrated bypass. The method may return to 804 to again measure the MCT and compare the temperature to the first temperature threshold.

If the MCT is determined to be below the first temperature threshold, the method proceeds to 814. At 814, the MCT is compared to a second temperature threshold. The second temperature threshold may be an inferred temperature at or below which combustion efficiency, based on the measured ambient temperature, may be reduced, or based on ambient conditions such as humidity and barometric pressure, as described above. For example, when the MCT is lower than the second temperature threshold, a likelihood of condensation forming within the intake region, e.g., in cooling channels of the VTC-CAC, is increased. In another example, the second temperature threshold may be a temperature below which release of combustion products such as carbon monoxide and hydrocarbons to the atmosphere is increased.

If the MCT is not above the second temperature threshold, the method continues to 816 to activate the solenoid to release the brake band. At 818, the stepper motor is activated to rotate the threaded screw in the first direction (e.g., described above with respect to FIGS. 2-7C). Rotation of the threaded screw in this direction drives a forward, e.g., from the cool side to the warm side of the VTC-CAC, movement of the sliding gate as well as an opening of the hinged gate to increase intake air flow through the integrated bypass. The linear motion of the sliding gate and pivoting of the hinged gate continue until the pivoting of the hinged gate is stopped by contact between the hinged gate and an outer wall of the bypass. At this position, a fraction, representing a minimum amount of cooling provided by the VTC-CAC, of the cooling channels remain open, such as 25%, or another value determined based on a geometry of a header tank enclosing the dual-gate mechanism and analysis by CFD. The stepper motor and the solenoid are deactivated at 820 with the hinged gate in a fully open position. Intake air is flowed through the reduced number of open cooling channels and through the fully opened bypass at 822. The method may return to 814 to again measure the MCT and compare the temperature to the second temperature threshold.

If the MCT is determined to be higher than the second temperature threshold, the method continues to 824 to estimate a target position of the dual-gate mechanism based on the current engine conditions. For example, the controller may calculate a MCT that provides a maximum combustion efficiency and engine power output based on a current engine speed and load, the calculated MCT falling within a temperature range between the first and second temperature thresholds. The controller may infer a position of the dual-gate mechanism that adjusts the current MCT toward the target MCT. In another example, the controller may monitor an amount of condensate forming within the cooling channels of the VTC-CAC. The amount of condensation may be determined from an inferred condensation formation value, calculated based on air flow velocity from MAF measurement and/or from a difference between the dew point of the intake air and either a temperature of the VTC-CAC or the MCT. In still further examples, the target position of the dual-gate mechanism may be based on engine speed and engine load (e.g., the controller may access a look-up table that plots target position of the dual-gate mechanism as a function of engine speed and engine load), mass air flow, boost pressure, EGR amount, and/or other operating parameters.

At 826, the position of the dual-gate mechanism may be adjusted based on an offset from the estimated target position. If the current MCT is lower than a target or desired MCT, the stepper motor and solenoid may be activated to increase the opening of the integrated bypass and decrease the number of open cooling channels until the target position is reached. Thus, as indicated at 828, adjusting the position of the dual-gate mechanism may include activating the stepper motor and solenoid until the dual-gate mechanism reaches the target position. On the other hand, if the current MCT is higher than the target or desired MCT, the stepper motor is deactivated and the solenoid activated to decrease the integrated bypass opening and increase the number of open cooling channels until the target position is reached. Thus, as indicated at 830, adjusting the position of the dual-gate mechanism may include deactivating the stepper motor and activating the solenoid until the dual-gate mechanism reaches the target position.

Alternatively, if the condensation in the VTC-CAC is determined to increase above a threshold amount, such as an amount that may cause misfire at the cylinders if purged to the intake manifold, the dual-gate mechanism may be adjusted so that the hinged gate is fully open and a minimum number of cooling channels are open to intake air flow, regardless of the position of the dual-gate mechanism relative to the target position. In this way, a likelihood of introduction of excessive amounts of condensate to the combustion chambers is decreased. The dual-gate mechanism may be maintained in this position until further steps to remove the condensate are performed, such as purging to a collection vessel, etc.

At 832, the method includes flowing intake air through the subset of cooling channels that are not blocked by the sliding gate and through the bypass, with the dual-gate mechanism adjusted to the target position. The method may return to 814 to again measure the MCT and compare the temperature to the second temperature threshold.

In some instances, an inlet header tank, such as the first header tank 206 of FIGS. 2 and 7A-7C, may not allow implementation of a dual-gate mechanism therein. For example, in an engine system adapted with twin turbochargers, two inlets may be disposed in the inlet head tank which may adversely affect a span of operation of a sliding gate of the dual-gate mechanism. As an alternative, the dual-gate mechanism may be positioned in an outlet header tank of a VTC-CAC, as shown in FIG. 9 in a front view 900 of a second example embodiment of a VTC-CAC 902. The second example of the VTC-CAC 902 may be similarly configured as the first example of the VTC-CAC 200, having a plurality of cooling channels 904 extending along the y-axis between a first, inlet header tank 906 and a second, outlet header tank 908 and fluidically coupling the inlet header tank 906 to the outlet header tank 908.

The inlet header tank 906 may have more than one inlet port 910 to flow air boosted by turbocharger compressors to the plurality of cooling channels 904. The boosted air flows through the plurality of the cooling channels from the inlet header tank 906 to the outlet header tank 908. The outlet header tank 908 has at least one outlet port 912 through which cooled boosted air may exit the VTC-CAC 902. The VTC-CAC may be further equipped with an integrated bypass 914 which also fluidically couples the inlet header tank 906 to the outlet header tank 908. The integrated bypass 914, similar to the integrated bypass 202 of FIGS. 2 and 7A-7C, may deliver a portion of the warm boosted air in the inlet header tank 906 directly to the outlet header tank 908 without flowing through the plurality of cooling channels 904. The VTC-CAC 902 may have a cool side 916 on an opposite side of the VTC-CAC 902 from the integrated bypass 914 and a warm side 918 adjacent to the integrated bypass 914.

The dual-gate mechanism may be arranged in the outlet header tank 908 instead of the inlet header tank 906. For example, a threaded screw 920 may extend across the outlet header tank 908 along the x-axis to adjust a position of a sliding gate and a hinged gate of the dual-gate mechanism, such as the sliding gate 234 and the hinged gate 236 of FIG. 2. The threaded screw 920 may be coupled to a stepper motor 922, similar to the stepper motor 242 of FIGS. 2, 4, and 5.

A first cut-away view 1000 of the VTC-CAC 902 depicted in FIG. 10 shows the VTC-CAC 902 cut along the x-y plane and provides a more detailed view of the outlet header tank 908. A dual-gate mechanism 1002 is arranged within the outlet header tank 908, depicted in a first position, and includes a first, sliding gate 1006 and a second gate 1008. While the second gate 1008 is shown as an alternative to a hinged gate in FIG. 10, the second gate 1008 may be a hinged gate in other examples. Operation of the dual-gate mechanism 1002, when the second gate 1008 is the hinged gate, is similar to operation of the dual-gate mechanism 232 of in FIGS. 2-7C. In other examples however, such as shown in FIGS. 10-12, the second gate 1008 may be a threaded valve. Details of the threaded valve are provided further below.

By positioning the dual-gate mechanism 1002 in the outlet header tank 908 instead of the inlet header tank 906, a similar adjustment of boosted air flow delivered to an intake manifold of an engine through the outlet port 912 and the integrated bypass, as determined by an opening of the threaded valve 1008, is enabled. However, a pressure distribution in the VTC-CAC 902 may differ from the VTC-CAC 200 described above. For example, arrangement of the dual-gate mechanism 1002 in the outlet header tank 908 allows boosted air entering the VTC-CAC 902 through the inlet header tank 906 to flow into each channel of the plurality of cooling channels 904. However, depending on a position of the sliding gate 1006 along the threaded screw 920, an amount of air flowing out of the plurality of cooling channels and through the outlet header tank 908 is allowed to exit through the outlet port 912 (as indicated by a dashed circle).

In FIG. 10, the first position of the dual-gate mechanism 1002 positions the sliding gate 1006 at a mid-point along the threaded screw 920, between the cool side 916 and the warm side 918 of the VTC-CAC 902. Boosted air flowing into the outlet header tank 908 through a first portion (e.g., equal to a number of cooling channels on the warm side 918) of the plurality of cooling channels 904 positioned above the sliding gate 1006, with respect to the x-axis, are not fluidically coupled to the outlet port 912 due to the sliding gate 1006 acting as a barrier within the outlet header tank 908. In other words, the first portion of the plurality of cooling channels 904 is blocked or closed. The sliding gate 1006 divides air in the outlet header tank 908, allowing air delivered via a second portion of the plurality of cooling channels 904 (e.g., equal to a number of cooling channels on the warm side 918) positioned below the sliding gate 1006, with respect to the x-axis, to be fluidically coupled to the outlet port 912. In other words the sliding gate 1006 is a mobile, sealed barrier that controls a number of channels of the plurality of cooling channels 904 that are fluidically coupled to the outlet port 912. The sliding gate motion is synchronized with the threaded valve 1008, such that increasing a number of the cooling channels 904 fluidically coupled to the outlet port 904 decreases an amount of air bypassed through the bypass 914. Conversely, decreasing the number of cooling channels 904 fluidically coupled to the outlet port 904 increases the amount of air bypassed through the bypass 914. As the sliding gate 1006 moves up, more channels of the plurality of cooling channels 904 are fluidically coupled to the outlet port 912, increasing a cooling of the air delivered to the intake manifold via the plurality of cooling channels 904 and reducing the air delivered through the bypass 914. As the sliding gate 1006 moves down, less of the plurality of cooling channels 904 are fluidically coupled to the outlet port 912 and more air is delivered through the bypass 914, thereby decreasing the cooling of the air reaching the intake manifold.

By allowing air to flow through each of the plurality of cooling channels 904, regardless of the position of the sliding gate 1006, a pressure in the first portion of the plurality of cooling channels 904, arranged above the sliding gate 1006, may rise. The air in the first portion of the plurality of cooling channels may be trapped within the VTC-CAC 902, unable to vent through the outlet port 912, resulting in an increase in pressure in a portion of the VTC-CAC 902 corresponding to channels in the cool side 916 of the VTC-CAC 902. While the higher pressure on the cool side 916 of the VTC-CAC 902 may degrade anti-condensation capabilities of the VTC-CAC 902, the loss of condensation inhibition is small and does not affect an MCT of an engine. Furthermore, the higher pressure may remain well below a burst pressure of the VTC-CAC 902.

For example, air contacts the sliding gate 1006 only after flowing through the plurality of cooling channels 904. Heat is absorbed from the warm boosted air as the air travels from the inlet header tank 906 to the outlet header tank 908, decreasing a temperature of the air that flows out of the plurality of cooling channels 904. The sliding gate 1006 is primarily exposed to cooled air, including mixing with a small amount of warm air that is diverted through the integrated bypass 914. As such, high temperature bearings, e.g., the high temperature bearings 304 of FIGS. 3-5 and 7A-7C, may not be demanded, enabling use of lower cost, lower temperature bearings at the sliding gate 1006 compared to when the dual-gate mechanism is implemented in the inlet head tank 906.

As described above, the second gate 1008 shown in FIG. 10 may be a threaded valve. An example of a threaded valve 1302 is shown in detail from a perspective view 1300 in FIG. 13. The threaded valve 1302 may be a non-limiting example of the second gate 1008 of FIGS. 10-12. The threaded valve 1302 may move simultaneous with a sliding gate, e.g., the sliding gate 1006 of FIG. 10, of the dual-gate mechanism 1002.

The threaded valve 1302 may resemble a diagonally sliced rectangular block with a rectangular cross-section along the x-z plane, a rectangular cross-section along the y-z plane, and a triangular cross-section along the x-y plane. A height 1306, a width 1308, and a depth 1310 of the threaded valve 1302 may be similar to a height, a width, and a depth of the integrated bypass 914 shown in FIGS. 10-12. A diagonal face 1312 of the threaded valve 1302 may have a cylindrical protrusion 1314 jutting upwards, along the x-axis and parallel with the x-axis, from the diagonal face 1312 in a central region of the diagonal face 1312.

The cylindrical protrusion 1314 includes a threaded insert 1316, forming a circular opening extending along the x-axis through a center of the cylindrical protrusion 1314. The threaded insert 1316 may have a threaded inner surface adapted to engage with the threaded screw 920 of FIGS. 9-12. In one example, the threaded inner surface of the threaded insert 1316 may have 7/16-56 threading.

The threaded valve 1302 includes seals 1318 extending along edges of the threaded valve 1302 configured to be in contact with inner surface of the integrated bypass of the VTC-CAC. The seals 1318 may be formed of a deformable, flexible material such as rubber and allows the threaded valve to sealingly engage with the inner surfaces of the integrated bypass, blocking air from flowing between edges of the threaded valve 1302 and the inner surface of the integrated bypass.

The threaded screw may be configured with regions of different threading to engage with each of the sliding gate, e.g., the sliding gate 1006 of FIGS. 10-12, and the threaded valve, e.g., the threaded valve 1302 of FIG. 13. An example of a threaded screw 1402 is shown in a perspective view 1400 in FIG. 14 which may be a non-limiting example of the threaded screw 920 of FIGS. 9-12. The threaded screw 1402 may have a length 1404 similar to a height, as defined along the x-axis, of a VTC-CAC, e.g., the VTC-CAC 902 of FIGS. 9-12.

The length 1404 of the threaded screw 1402 may be divided into a first portion 1406, a second portion 1408, and a third portion 1410. The first portion 1406 is positioned above the second and third portions 1408, 1410, and the second portion 1408 is arranged between the first portion 1406 and the third portion 1410. A length of the first portion 1406, e.g., a fraction of the length 1404 of the threaded screw 1402 corresponding to the first portion 1406, may be longer than lengths of both the second portion 1408 and the third portion 1410.

The first portion 1406 has a first threaded region 1412 extending along most of the length of the first portion 1406, adapted to engage with the sliding gate of the dual-gate mechanism. For example, the first threaded region 1412 and a threaded insert (e.g., the threaded insert 404 shown in FIGS. 4-5) of the sliding gate may both have ACME 3/8-8 threading. The first portion 1406 has an upper bearing and seal journal 1416 at a top of the first portion 1406, configured to engage with a bearing in an outlet tank of the VTC-CAC.

The second portion 1408 of the threaded screw 1402 may have a diameter 1418 similar to or different from the first portion 1406. An outer surface of the second portion 1408 of the threaded screw 1402 may be adapted with threading that matches a threading of an insert of a threaded valve, such as the threaded insert 1316 of the threaded valve 1302 of FIG. 13. In one example, the threading of the second portion 1408 may be 7/16-56 threading. The different threading used in the first portion 1406 and the second portion 1408 may be adapted to enable the sliding gate to travel a greater distance per rotation of the threaded screw 1402 than the threaded valve.

The third portion 1410 of the threaded screw 1402 may have a diameter 1420 that is larger than the diameter 1418 of the second portion 1408. The third portion 1410 of the threaded screw 1402 may be a lower bearing and seal journal, configured with a motor drive coupling 1422 at a bottom end of the third portion 1410, with respect to the y-axis. The motor drive coupling 1422 may enable the threaded screw 1402 to couple to a stepper motor, such as the stepper motor 922 of FIGS. 9-12. The engagement of the threaded screw 1402 with the stepper motor at the motor drive coupling 1422 may enable rotation of the threaded screw 1402 and adjustment of the dual-gate mechanism, as driven by the stepper motor.

Returning to FIG. 10, the first position of the VTC-CAC 902 may correspond to a partially open position of the second gate 1008 or, hereafter, threaded valve 1008. For example, the threaded screw 920 is rotated so that the sliding gate 1006 is at a mid-position defining a flow through the plurality of cooling channels 904 that is between a maximum number of open channels, e.g., not blocked, (shown in FIG. 11) and a maximum number of blocked channels (shown in FIG. 12), which may also represent a minimum number of open channels.

The threaded valve 1008 may move in synchronism with the sliding gate 1006 as the threaded screw 920 is rotated. The mid-position of the sliding gate 1006 corresponds to a partially open position of the threaded valve 1008 in the bypass 914. The threaded valve 1008 is mostly below the bypass 914, with respect to the x-axis but a small portion of the threaded valve 1008 may protrude into the bypass 914, thereby decreasing flow from the bypass 914 to the outlet port 912 of the outlet header tank 908 relative to then the threaded valve 1008 is fully open (as shown in FIG. 12).

The dual-gate mechanism 1002 may be adjusted to a second position as shown in FIG. 11 in a second cut-away view 1100 by rotating the threaded screw 920 in a first rotational direction. In the second position, the sliding gate 1006 is located higher along the x-axis than in the first position of FIG. 10, and at a top of the threaded screw 920. In this position, the sliding gate 1006 is fully retracted, e.g., collapsed so that dimensions of the sliding gate 1006 are reduced, and all of the plurality of cooling channels 904 are open and fluidically coupled to the outlet port 912.

The threaded valve 1008 is also raised along the x-axis compared to the first position of FIG. 10, sealing the bypass 914 and blocking flow from the bypass 914 to the outlet port 912. As such, the second position of FIG. 11 provides a maximum amount of cooled air to the intake manifold through the outlet port 912.

By rotating the threaded screw 920 of the dual-gate mechanism 1002 in a second, opposite rotational direction, the dual-gate mechanism 1002 is adjusted to a third position as shown in a third cut-away view 1200 in FIG. 12. In the third position, the sliding gate 1006 may be adjusted downward, along the x-axis to a point along the threaded screw 920 that is lower than both the first and second positions of FIGS. 10 and 11, respectively. The sliding gate 1006 may be arranged level with an uppermost point of the outlet port 912. This location of the sliding gate 1006 may be a lowest position that the sliding gate 1006 may be adjusted to. In other words, the sliding gate 1006 may not be positioned below the position shown in FIG. 12. As such, when the dual-gate mechanism 1002 is in the third position, a maximum number of blocked channels of the plurality of cooling channels 904 (which may be equal to a minimum number of open channels) is provided. More specifically, a number of channels mostly along the cool side 916 of the VTC-CAC 902, but also including some of the channels along the warm side 918, are blocked.

The lowering of the sliding gate 1006 is concurrent with a lowering of the threaded valve 1008 along the x-axis. The threaded valve 1008 may be lowered by a maximum amount in the third position, resulting in a positioning of the threaded valve 1008 that is lower than when the threaded valve 1008 is in both the first and second positions of FIGS. 10 and 11. In the third position, the threaded valve 1008 may be in a fully open position where the threaded valve 1008 is entirely below the bypass 914, enabling a maximum flow of air from the bypass 914 to the outlet port 912. The third position of the dual-gate mechanism 1002 therefore provides a minimum amount of cooled air to the intake manifold by reducing a number of open channels of the plurality of cooling channels 904 and fully opening the bypass 914.

The coupling of the different threading of the threaded screw 920, e.g., the different threading of the first portion 1406 versus the second portion 1408 of the threaded screw 1402 of FIG. 14, converts rotational motion of the threaded screw 920, as driven by the stepper motor 922, into translational motion of the threaded valve 1008. For example, the threaded screw 1106 may be rotated in the second rotational direction to shift the sliding gate 1006 of the dual-gate mechanism 1002 e downwards along the y-axis to decrease a number of the plurality of cooling channels 904 fluidically coupled to the outlet port 912 of the outlet header tank 908. Rotating of the threaded screw 920 in the second rotational direction may be driven by operation of the stepper motor 922 in response to a command from a controller, such as controller 12 of FIG. 1, to increase an MCT of an engine intake. Reduced cooling of the boosted air is provided by rotating the threaded screw 920 in the second rotational direction.

As the threaded screw 920 rotates in the second rotational direction, engagement of of the threaded screw 920 with a threaded insert of the threaded valve 1008 forces the threaded valve 1008 to also move downwards along the y-axis. The threaded valve 1008 may continue to move downwards until the stepper motor 922 is deactivated or a maximum travel distance of the threaded valve 1008 is reached (e.g., the threaded valve 1008 is positioned as shown in the third position of FIG. 12). The controller may then terminate the rotation of the threaded screw 920 based on a preset total number of rotation count of the threaded screw 920. When the threaded valve 1008 reaches the maximum travel distance, e.g., a first translational position, air flow from the integrated bypass 914 into the outlet header tank 908 may be at the maximum flow.

The threaded screw 920 may be rotated in first rotational direction, when the stepper motor 922 is commanded to operate in a reverse motion, relative to the second rotational direction. As the threaded screw 920 rotates in the first rotational direction, the sliding gate 1006 may shift upwards along the y-axis, increasing a number of the plurality of cooling channels 904 fluidically coupled to the outlet port 912 of the outlet header tank 908. Concurrently, the threaded valve 1008 is forced to move upwards along the y-axis. The threaded valve 1008 may continue travelling upwards until the stepper motor 922 is commanded to stop or until the threaded valve 1008 reaches the maximum travel distance as indicated by the rotation count from the controller, e.g., the threaded valve reaches a second translational position. In some examples, a limit switch may be arranged in the outlet header tank 908 that may automatically deactivate the stepper motor 922 when a controller error is detected.

Thus, the threaded valve 1008 may adjust air flow emerging from the integrated bypass 914 and entering the outlet header tank 908 in a similar manner as a hinged gate of a dual-gate mechanism, as shown in FIGS. 2-7C. The threaded valve 1008 may provide a simpler mechanism for controlling flow from the integrated bypass 914, allowing the position of the threaded valve 1008 to be more readily synchronized with the sliding gate of the dual-gate mechanism than the hinged gate. A less complex mechanism may result in implementation of fewer components configured to withstand high temperatures imposed by the heated boosted air flowing through the integrated bypass 914. Overall costs of the VTC-CAC may therefore be reduced.

In this way, a MCT may be adjusted by adapting an engine system with a variable thermal capacity charge air cooler (VTC-CAC). The VTC-CAC may include an integrated bypass that diverts air from cooling channels of the VTC-CAC and a dual-gate mechanism that adjusts a division of air between the cooling channels and the bypass. By configuring the VTC-CAC with the dual-gate mechanism that is controlled by a single actuating device comprising a stepper motor, the MCT may be controlled without increasing a size or complexity of the charge air cooler. A synchronized adjustment of flow between the cooling channels and the bypass circumvents changes in pressure across an inlet and an outlet of the VTC-CAC as well as changes in air flow rate through the VTC-CAC. Furthermore, by configuring the positioning of the dual-gate mechanism to depend solely on the measured MCT, no additional controls are introduced into the system. The MCT may be maintained within a desirable range that enhances combustion efficiency while decreasing a likelihood of engine knock, condensation, and emission of carbon monoxide and hydrocarbons. The technical effect of adjusting MCT via the VTC-CAC is that a performance and power output of the engine is improved while occurrences of both engine knock due to high MCT and misfire due to condensation are decreased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

In one embodiment, a cooling system includes an intake passage configured to deliver boosted air to an intake manifold of the engine, a charge air cooler coupled to the intake passage, wherein the charge air cooler has an integrated bypass, a plurality of cooling channels, and a dual-gate mechanism arranged at an outlet end of the charge air cooler, the dual-gate mechanism including a first gate controlling flow of boosted air from the integrated bypass to the outlet and a second gate dividing the plurality of cooling channels into open channels and blocked channels, the blocked channels fluidically blocked from flowing intake air to the outlet. In a first example of the cooling system, an inlet is arranged in a first header tank and an outlet is arranged in a second header tank of the charge air cooler that is positioned at an opposite end of the charge air cooler from the first header tank, and wherein the plurality of cooling channels and the integrated bypass each fluidically couple the first header tank to the second header tank. A second example of the cooling system optionally includes the first example, and further includes, a stepper motor configured to actuate the dual-gate mechanism and drive simultaneous movement of the first gate and the second gate, the stepper motor arranged external to the second header tank. A third example of the cooling system optionally includes one or more of the first and second examples, and further includes, wherein the first gate is positioned at an intersection of an outlet of the integrated bypass and the second header tank and the second gate of the dual-gate mechanism is positioned in the second header tank. A fourth example of the cooling system optionally includes one or more of the first through third examples, and further includes, wherein the second gate is arranged in the second header tank and extends along an entirety of the second header tank along a first direction, parallel with the plurality of cooling channels, from outlets of the plurality of cooling channels to an inner surface of the first header tank, the inner surface opposite of the outlets of the plurality of cooling channels, and in a second direction from a first side of the second header tank to a second side of the second header tank. A fifth example of the cooling system optionally includes one or more of the first through fourth examples, and further includes, wherein the open channels include each cooling channel on a hot side of the second header tank and the blocked channels include each cooling channel on a cool side of the second header tank, a boundary between the hot side of the first header tank and the cool side of the first header tank defined by the second gate, the outlet positioned on the hot side of the second header tank, and wherein the second gate is configured to move laterally in the second header tank to simultaneously adjust a number of cooling channels comprising the open channels and a number cooling channels comprising the blocked channels.

In another embodiment, variable thermal capacity charge air cooler (VTC-CAC) includes an integrated bypass, a plurality of cooling channels arranged parallel with the integrated bypass and extending between a first header tank arranged at an inlet end of the VTC-CAC and a second header tank arranged at an outlet end of the VTC-CAC, a dual-gate mechanism having a first gate positioned in one of the first header tank or the second header tank that fluidically couples openings of the plurality of cooling channels to an outlet of the VTC-CAC, a second gate positioned across an opening of the integrated bypass, and a threaded screw inserted through both the first gate and the second gate, and a stepper motor coupled to the threaded screw to drive rotation of the threaded screw. In a first example of the VTC-CAC, the first gate is arranged in the second header tank and configured to travel along the threaded screw across downstream openings of the plurality of cooling channels, the threaded screw arranged perpendicular to the plurality of cooling channels in the second header tank, and the opening of the integrated bypass where the second gate is positioned in an outlet opening of the integrated bypass at an intersection of the integrated bypass and the second header tank. A second example of the VTC-CAC optionally includes the first example, and further includes, wherein the first gate is a sliding gate and the second gate is a hinged gate and rotating the threaded screw in a first rotational direction drives a linear movement of the sliding gate across the openings of the cooling channels towards the integrated bypass and simultaneously drives pivoting of the hinged gate to increase the opening of the integrated bypass. A third example of the VTC-CAC optionally includes one or more of the first and second example, and further includes, wherein the first gate is a sliding gate and the second gate is a threaded valve and rotating the threaded screw in a first rotational direction drives linear movement of the sliding gate across the openings of the cooling channels towards the integrated bypass and simultaneously shifts the threaded valve away from the integrated bypass along a first translational direction parallel with the threaded screw to increase the opening of the integrated bypass. A fourth example of the VTC-CAC optionally includes one or more of the first through third examples, and further includes, wherein the threaded valve is coupled to the threaded screw by an insert positioned adjacent to the opening of the integrated bypass at one end of the threaded screw and wherein the insert has threading on an outer surface of the insert configured to interface with threading on an inner surface of an aperture extending entirely through a central region of the threaded screw. A fifth example of the VTC-CAC optionally includes one or more of the first through fourth examples, and further includes, wherein rotating the threaded screw in a second rotational direction, opposite of the first rotational direction, drives linear movement of the sliding gate away from the integrated bypass and simultaneously shifts the threaded valve towards integrated bypass along a second translational direction, opposite of the first translational direction, to decrease the opening of the integrated bypass. A sixth example of the VTC-CAC optionally includes one or more of the first through fifth examples, and further includes, wherein movement of the threaded valve along both the first translational direction and the second translational direction is halted by detection of the threaded screw rotating through a preset rotation count, the preset rotation count corresponding to a maximum travel distance of the threaded valve. A seventh example of the VTC-CAC optionally includes one or more of the first through sixth examples, and further includes, wherein a height, a width, and a depth of the threaded valve is similar to a height, a width, and a depth of the integrated bypass and wherein the threaded valve blocks flow between the integrated bypass the second header tank when the threaded valve is in the closed position. An eighth example of the VTC-CAC optionally includes one or more of the first through seventh examples, and further includes, a brake drum connected to the stepper motor, the brake drum housing a coil spring and a brake band surrounding the coil spring. A ninth example of the VTC-CAC optionally includes one or more of the first through eighth examples, and further includes, wherein the coil spring is adapted to increase in tension when driven by the stepper motor rotating the threaded screw in a first rotational direction, and wherein the brake band is configured to maintain tension of the coil spring when the stepper motor is deactivated. A tenth example of the VTC-CAC optionally includes one or more of the first through ninth examples, and further includes, wherein the first gate includes a plurality of stacked sections, each section of the plurality of stacked sections configured with smaller dimensions than an adjacent section below so that each section nests within and slides in and out of the adjacent section below.

In yet another embodiment, a method includes adjusting a first flow volume of the VTC-CAC while also adjusting an second flow amount through an integrated bypass of the VTC-CAC based on manifold charge temperature; and wherein the adjusting of the first flow volume and the adjusting of the second flow amount comprises actuating a dual-gate mechanism arranged in a header tank of the VTC-CAC and configured to both adjust the first flow volume and the intake air flow amount via a single actuation action. In a first example of the method, the VTC-CAC comprises a plurality of cooling channels, and wherein adjusting the first flow volume comprises adjusting a number of cooling channels of the plurality of cooling channels fluidically coupled to an outlet of the VTC-CAC, and further comprising as the number of cooling channels fluidically coupled to the intake passage decreases, increasing the intake air flow amount through the integrated bypass of the VTC-CAC. A second example of the method optionally includes the first example, and further includes, wherein adjusting the number of cooling channels comprises adjusting a position of a sliding gate of the dual-gate mechanism by rotating a threaded screw that engages a threaded insert disposed in the sliding gate and wherein increasing the intake air amount bypassing the cooling channels comprises adjusting a position of a threaded valve of the dual-gate mechanism by rotating the threaded screw that engages a threaded insert disposed in the threaded valve.

In another representation, a cooling system for an engine includes a variable thermal capacity charge air cooler (VTC-CAC) having an integrated bypass, a plurality of cooling channels, a dual-gate mechanism adjusting flow of boosted air to an outlet of the VTC-CAC, and a motor driving movement of the dual-gate mechanism, an intake manifold positioned downstream of the VTC-CAC and coupled to the VTC-CAC by an intake passage, a controller with computer readable instruction stored on non-transitory memory that, when executed, cause the controller to, responsive to detection of a manifold charge temperature falling below a first threshold, activate the motor to decrease a flow of cooled boosted air to the intake manifold, and responsive to detection of the manifold charge temperature rising above a second threshold, deactivate the motor to increase a flow of cooled boosted air to the intake manifold.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cooling system for an engine, comprising:
an intake passage configured to deliver boosted air to an intake manifold of the engine;
a charge air cooler coupled to the intake passage, wherein the charge air cooler has an integrated bypass, a plurality of cooling channels, and a dual-gate mechanism arranged at an outlet end of the charge air cooler, the dual-gate mechanism including a first gate controlling flow of boosted air from the integrated bypass to the outlet and a second gate dividing the plurality of cooling channels into open channels and blocked channels, the blocked channels fluidically blocked from flowing intake air to the outlet.

2. The cooling system of claim 1, wherein an inlet is arranged in a first header tank and an outlet is arranged in a second header tank of the charge air cooler that is positioned at an opposite end of the charge air cooler from the first header tank, and wherein the plurality of cooling channels and the integrated bypass each fluidically couple the first header tank to the second header tank.

3. The cooling system of claim 2, further comprising a stepper motor configured to actuate the dual-gate mechanism and drive simultaneous movement of the first gate and the second gate, the stepper motor arranged external to the second header tank.

4. The cooling system of claim 2, wherein the first gate is positioned at an intersection of an outlet of the integrated bypass and the second header tank and the second gate of the dual-gate mechanism is positioned in the second header tank.

5. The cooling system of claim 2, wherein the second gate is arranged in the second header tank and extends along an entirety of the second header tank along a first direction, parallel with the plurality of cooling channels, from outlets of the plurality of cooling channels to an inner surface of the first header tank, the inner surface opposite of the outlets of the plurality of cooling channels, and in a second direction from a first side of the second header tank to a second side of the second header tank.

6. The cooling system of claim 2, wherein the open channels include each cooling channel on a hot side of the second header tank and the blocked channels include each cooling channel on a cool side of the second header tank, a boundary between the hot side of the first header tank and the cool side of the first header tank defined by the second gate, the outlet positioned on the hot side of the second header tank, and wherein the second gate is configured to move laterally in the second header tank to simultaneously adjust a number of cooling channels comprising the open channels and a number cooling channels comprising the blocked channels.

7. A variable thermal capacity charge air cooler (VTC-CAC), comprising:
an integrated bypass;
a plurality of cooling channels arranged parallel with the integrated bypass and extending between a first header tank arranged at an inlet end of the VTC-CAC and a second header tank arranged at an outlet end of the VTC-CAC;
a dual-gate mechanism having a first gate positioned in one of the first header tank or the second header tank that fluidically couples openings of the plurality of cooling channels to an outlet of the VTC-CAC, a second gate positioned across an opening of the integrated bypass, and a threaded screw inserted through both the first gate and the second gate; and
a stepper motor coupled to the threaded screw to drive rotation of the threaded screw.

8. The VTC-CAC of claim 7, wherein the first gate is arranged in the second header tank and configured to travel along the threaded screw across downstream openings of the plurality of cooling channels, the threaded screw arranged perpendicular to the plurality of cooling channels in the second header tank, and the opening of the integrated bypass where the second gate is positioned in an outlet opening of the integrated bypass at an intersection of the integrated bypass and the second header tank.

9. The VTC-CAC of claim 8, wherein the first gate is a sliding gate and the second gate is a threaded valve and rotating the threaded screw in a first rotational direction drives linear movement of the sliding gate across the openings of the plurality of cooling channels towards the integrated bypass and simultaneously shifts the threaded valve away from the integrated bypass along a first translational direction parallel with the threaded screw to increase the opening of the integrated bypass.

10. The VTC-CAC of claim 9, wherein the threaded valve is coupled to the threaded screw by an insert positioned adjacent to the opening of the integrated bypass at one end of the threaded screw and wherein the insert has threading on an outer surface of the insert configured to interface with threading on an inner surface of an aperture extending entirely through a central region of the threaded screw.

11. The VTC-CAC of claim 9, wherein rotating the threaded screw in a second rotational direction, opposite of the first rotational direction, drives linear movement of the sliding gate away from the integrated bypass and simultaneously shifts the threaded valve towards integrated bypass along a second translational direction, opposite of the first translational direction, to decrease the opening of the integrated bypass.

12. The VTC-CAC of claim 11, wherein movement of the threaded valve along both the first translational direction and the second translational direction is halted by detection of the threaded screw rotating through a preset rotation count, the preset rotation count corresponding to a maximum travel distance of the threaded valve.

13. The VTC-CAC of claim 12, wherein a height, a width, and a depth of the threaded valve is similar to a height, a width, and a depth of the integrated bypass and wherein the threaded valve blocks flow between the integrated bypass the second header tank when the threaded valve is in the closed position.

14. The VTC-CAC of claim 7, wherein the first gate is a sliding gate and the second gate is a hinged gate and rotating the threaded screw in a first rotational direction drives a linear movement of the sliding gate across the openings of the plurality of cooling channels towards the integrated bypass and simultaneously drives pivoting of the hinged gate to increase the opening of the integrated bypass.

15. The VTC-CAC of claim 7, further comprising a brake drum connected to the stepper motor, the brake drum housing a coil spring and a brake band surrounding the coil spring.

16. The VTC-CAC of claim 15, wherein the coil spring is adapted to increase in tension when driven by the stepper motor rotating the threaded screw in a first rotational direction, and wherein the brake band is configured to maintain tension of the coil spring when the stepper motor is deactivated.

17. The VTC-CAC of claim 7, wherein the first gate includes a plurality of stacked sections, each section of the plurality of stacked sections configured with smaller dimensions than an adjacent section below so that each section nests within and slides in and out of the adjacent section below.

18. A method for a variable thermal capacity charge air cooler (VTC-CAC), comprising:
adjusting a first flow volume of the VTC-CAC while also adjusting a second flow amount through an integrated bypass of the VTC-CAC based on manifold charge temperature; and wherein the adjusting of the first flow volume and the adjusting of the second flow amount comprises actuating a dual-gate mechanism arranged in a header tank of the VTC-CAC and configured to both adjust the first flow volume and the second flow amount via a single actuation action.

19. The method of claim 18, wherein the VTC-CAC comprises a plurality of cooling channels, and wherein adjusting the first flow volume comprises adjusting a number of cooling channels of the plurality of cooling channels fluidically coupled to an outlet of the VTC-CAC, and further comprising, as the number of cooling channels fluidically coupled to an intake passage decreases, increasing the second flow amount through the integrated bypass of the VTC-CAC.

20. The method of claim 19, wherein adjusting the number of cooling channels comprises adjusting a position of a sliding gate of the dual-gate mechanism by rotating a threaded screw that engages a threaded insert disposed in the sliding gate and wherein increasing an intake air amount bypassing the plurality of cooling channels comprises adjusting a position of a threaded valve of the dual-gate mechanism by rotating the threaded screw that engages a threaded insert disposed in the threaded valve.

* * * * *